United States Patent
Kang et al.

(10) Patent No.: US 9,756,496 B2
(45) Date of Patent: Sep. 5, 2017

(54) METHOD AND APPARATUS FOR DISCOVERING NEIGHBOR DEVICE IN D2D COMMUNICATION NETWORK

(71) Applicants: Samsung Electronics Co., Ltd., Gyeonggi-do (KR); Korea University Research and Business Foundation, Seoul (KR)

(72) Inventors: Hye Joong Kang, Seoul (KR); Chung Gu Kang, Seoul (KR); Kwon Yeol Park, Seoul (KR); Sang Heon Pack, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/329,750

(22) Filed: Jul. 11, 2014

(65) Prior Publication Data

US 2015/0017979 A1  Jan. 15, 2015

(30) Foreign Application Priority Data

Jul. 12, 2013  (KR) .................. 10-2013-0082250

(51) Int. Cl.
*H04W 4/00* (2009.01)
*H04W 8/00* (2009.01)

(52) U.S. Cl.
CPC ................... *H04W 8/005* (2013.01)

(58) Field of Classification Search
CPC ..... H04W 8/005; H04W 4/005; H04W 92/18; Y02B 60/50
USPC ...................................... 455/426.1
See application file for complete search history.

(56) References Cited

U.S. PATENT DOCUMENTS

| | | | |
|---|---|---|---|
| 7,898,983 B2 | 3/2011 | Laroia et al. | |
| 2009/0013081 A1 | 1/2009 | Laroia et al. | |
| 2009/0017855 A1* | 1/2009 | Kwon ................ | H04W 76/023 455/509 |
| 2009/0017857 A1* | 1/2009 | Kwon ................ | H04W 76/046 455/519 |
| 2010/0250673 A1 | 9/2010 | Laroia et al. | |
| 2010/0254308 A1 | 10/2010 | Laroia et al. | |
| 2010/0272081 A1 | 10/2010 | Laroia et al. | |
| 2011/0019541 A1 | 1/2011 | Li et al. | |
| 2011/0142014 A1* | 6/2011 | Banerjee ............ | H04L 63/0869 370/338 |

(Continued)

OTHER PUBLICATIONS

International Search Report dated Sep. 25, 2014 in connection with International Patent Application No. PCT/KR2014/006240; 3 pages.

(Continued)

*Primary Examiner* — Timothy Pham

(57) ABSTRACT

A method of a Mobile Station (MS) for discovering neighbor MSs in a Device to Device (D2D) network includes broadcasting, by a discovery MS, a discovery request signal for discovering neighbor MSs, using a discovery request resource region repeated with a first period, if a neighbor MS discovery event is detected; and receiving, by the discovery MS, a discovery signal from at least one of other MSs in response to the discovery request signal, using a discovery resource region repeated with a second period. Other embodiments including a method for a central node discovering neighbor MSs and a discovery MS and a central node are also disclosed.

16 Claims, 17 Drawing Sheets

(56) References Cited

U.S. PATENT DOCUMENTS

| | | | | |
|---|---|---|---|---|
| 2011/0317569 A1* | 12/2011 | Kneckt | ............ | H04W 74/0833 370/252 |
| 2013/0150061 A1 | 6/2013 | Shin et al. | | |
| 2013/0208626 A1* | 8/2013 | Lee | ....................... | H04W 48/16 370/255 |
| 2014/0206322 A1* | 7/2014 | Dimou | .................. | H04W 4/005 455/414.1 |
| 2014/0321452 A1* | 10/2014 | Choi | .................... | H04W 8/005 370/350 |
| 2014/0357269 A1* | 12/2014 | Zhou | .................... | H04W 8/005 455/434 |
| 2015/0063095 A1* | 3/2015 | Deng | .................... | H04W 8/005 370/221 |
| 2015/0305075 A1* | 10/2015 | Fodor | ................... | H04W 8/005 370/329 |

OTHER PUBLICATIONS

Written Opinion of International Searching Authority dated Sep. 25, 2014 in connection with International Patent Application No. PCT/KR2014/006240; 5 pages.

\* cited by examiner

METHOD AND APPARATUS FOR DISCOVERING NEIGHBOR DEVICE IN D2D COMMUNICATION NETWORK

PRIORITY

The present application is related to and claims the benefit under 35 U.S.C. §119(a) of a Korean patent application No. 10-2013-0082250 filed in the Korean Intellectual Property Office on Jul. 12, 2013, the entire disclosure of which is hereby incorporated by reference.

TECHNICAL FIELD

The present disclosure relates to a method and apparatus for discovering neighbor device in a Device-to-Device (D2D) communication network.

BACKGROUND

A D2D communication network means a network in which neighbor devices (or Mobile Stations (MSs)) perform communication directly without an infrastructure composed of centralized Access Points (APs) such as Base Stations (BSs) or APs. In the D2D communication network, an MS performs a discovery process of recognizing that there are MSs which are geographically close to each other to establish a radio link with a specific neighbor MS and transmit data with the linked MS. In this discovery process, MSs can be classified into a discovery MS (or discovery device) which recognizes that there are peripheral MSs and discovered MSs which allow peripheral MSs to recognize their existence. Herein, one MS can operate as a discovered MS while operating as a discovery MS.

A discovery method in the well-known D2D communication network can be classified into a distributed method and a centralized method. First of all, in the distributed method, a discovered MS transmits a discovery signal or a discovery message per certain period and a discovery MS receives the discovery signal or the discovery message and recognizes the discovered MS which transmits the discovery signal or the discovery message as a neighbor MS. That is, in the distributed method, several discovered MSs transmit their discovery signals alternately and a discovery MS receives the discovery signal such that the discovery MS recognize the existence of the discovered MS. Herein, because the discovered MS may not know the existence of the discovery MS, it must transmit the discovery message using its resources acquired from all discovery resources. Because the discovery MS may not know the existence of the discovered MS, it must search all discovery resources to receive the discovery signal. That is, although there is no discovery MS within a neighbor region, because the discovered MS does not recognize it, it transmits a discovery signal. Although there is no discovered MS within a neighbor region, because the discovery MS does not recognize it, it attempts to receive a discovery signal to consume unnecessary power.

Also, in the centralized method, a central node recognizes the existence of discovery MSs and discovered MSs and allocates transmission and reception resources for transmitting discovery signals dynamically. That is, in the centralized method, each MS transmits and receives a discovery signal using resources allocated from the central node and verifies whether there are neighbor MSs. As described above, in the centralized method, dynamical signaling for allocating transmission and reception resources to discovery MSs and discovered MSs must be performed. Herein, because discovery resources must be assigned to a plurality of unspecific discover MSs or a plurality of unspecific discovered MSs, it is necessary to allocate resources to MSs which are far more than the number of MS activated in a general cellular system.

SUMMARY

Accordingly, another aspect of the present invention is to provide a method and apparatus for informing a discovered MS of whether there is a discover MS in a D2D communication network.

Accordingly, another aspect of the present invention is to provide a method and apparatus for informing a discovery MS of whether there is a discovered MS in a D2D communication network.

Accordingly, another aspect of the present invention is to provide a method and apparatus for transmitting a discovery request signal at a predetermined period at a discovery MS and operating in an active or idle mode at a discovered MS according to whether to receive the discovery request signal in a D2D communication network.

Accordingly, another aspect of the present invention is to provide a method and apparatus for reducing power consumption by operating in an idle mode at a discovered MS until a next discovery request time point if the discovered MS does not receive a discovery request signal in a predetermined discovery request time point in a D2D communication network.

Accordingly, another aspect of the present invention is to provide a method and apparatus for operating in an active mode at a discovered MS until a next discovery request time point and transmitting discovery information if the discovered MS receives a discovery request signal in a predetermined discovery request time point in a D2D communication network.

Accordingly, another aspect of the present invention is to provide a method and apparatus for operating in an active mode until a next discovery request time point, receiving a discovery measurement request signal from a discovery MS, and reporting a result of measuring the discovery measurement request signal to a BS at a discovered MS if the discovered MS receives a discovery request signal in a predetermined discovery request time point in a D2D communication network.

A method of a Mobile Station (MS) for discovering neighbor MSs in a Device to Device (D2D) network includes broadcasting, by a discovery MS, a discovery request signal for discovering neighbor MSs, using a discovery request resource region repeated with a first period, if a neighbor MS discovery event is detected, and receiving, by the discovery MS, a discovery signal from at least one of other MSs in response to the discovery request signal, using a discovery resource region repeated with a second period.

An apparatus for discovering neighbor MSs in a D2D communication network includes a transceiver configured to transmit and receive signals for discovering neighbor MSs, and a controller configured to control functions for broadcasting a discovery request signal to discover neighbor MSs, using a discovery request resource region repeated with a first period, if a neighbor MS discovery event is detected; and detect a discovery signal from at least one of other MSs using a discovery resource region repeated with a second period.

An apparatus of a central node for discovering neighbor MSs in D2D communication network includes a transceiver configured to transmit and receive signals for discovering the neighbor MSs, and a controller configured to control functions for being requested from at least the one MS to update a neighbor list, allocating resources for transmitting a discovery request signal and a discovery signal of at least the one MS, receive a result of measuring a discovery signal of at least the one MS from at least one of other MSs, and update a neighbor list of at least the one MS using the received measured result, wherein the discovery request signal is transmitted in a resource of a discovery request resource region repeated with a first period, wherein the discovery signal is transmitted in a resource of a discovery region repeated with a second period in the first period.

A method of a Mobile Station (MS) for discovering neighbor MSs in a Device to Device (D2D) network includes transmitting a neighbor list update request signal to central node, if a neighbor MS discovery event is detected, receiving a signal allocating resources for transmission of a discovery request signal and a discovery measurement request signal, broadcasting, by a discovery MS, a discovery request signal for discovering neighbor MSs, using the allocated resource for the transmission of the discovery request signal, broadcasting, by the discovery MS, a discovery measurement request signal, using the allocated resource for the transmission of the discovery measurement request signal, and receiving a neighbor list from the central node.

A method of a central node for discovering neighbor MSs in a D2D communication network includes receiving a neighbor list update request signal from a discovery MS, allocating resources for transmitting a discovery request signal and a discovery measurement request signal of the discovery MS, receiving a result of measuring a discovery measurement request signal of the discovery MS from at least one of other MSs and updating a neighbor list of the MS using the received measured result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure will be described herein below with reference to the accompanying drawings. In the following description, well-known functions or constructions are not described in detail since they would obscure the disclosure in unnecessary detail.

Hereinafter, a description will be given for, in a normal cellular system which may perform communication between a BS and an MS, a D2D communication system in which each MS may establish a direct link with a neighbor MS and transmit and receive data with the linked MS. Also, an MS may determine time synchronization to be used in communication between MSs based on time synchronization provided in a cellular system in the present specification. Hereinafter, a device and an MS used together in the present specification have the same meaning. Hereinafter, for convenience of description, an MS which is in a situation where it must discover neighbor MSs is a discovery MS and an MS which is not in a situation where it must discover neighbor MSs is a discovered MS.

Figure 1:
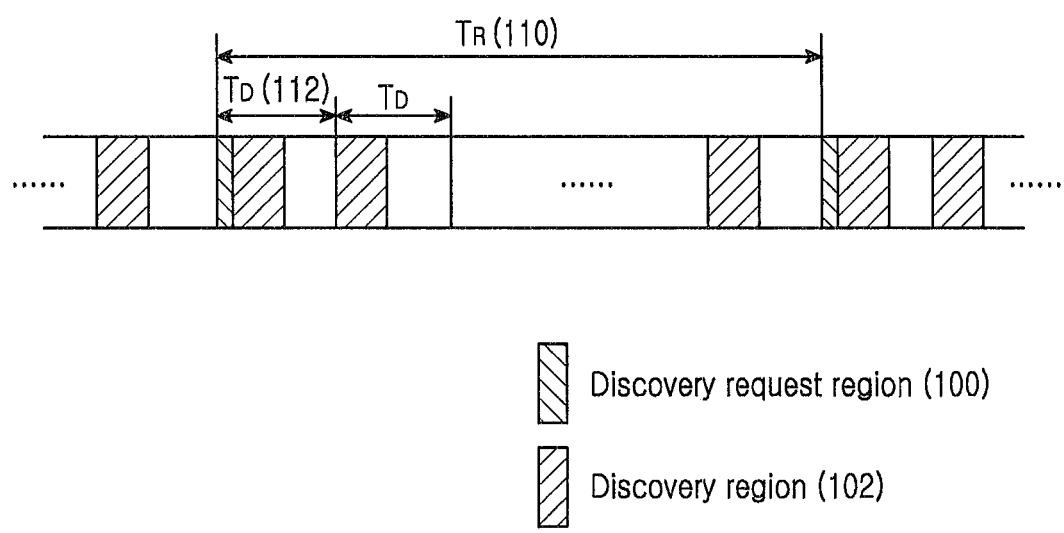
FIG. 1 illustrates a structure of frames for discovery between MSs in a D2D communication network according to one embodiment of the present disclosure.

FIG. 1 illustrates a structure of frames for discovery between MSs in a D2D communication network according to one embodiment of the present disclosure.

Referring to FIG. 1, the D2D communication network according to one embodiment of the present disclosure allocates a discovery request region 100 for transmitting a discovery request signal (or message) with the time period $T_R$ 110 repeatedly, which informs a neighbor MS(s) of existence of a discovery MS. The discovery request region 100 is located as a certain time and/or frequency resource within a predetermined time period $T_R$ 110. For example, the discovery request region 100 can be set to a time and/or frequency resource which is located in a start portion of every time period $T_R$ 110. Herein, the discovery request signal can be composed of sequences having vertical characteristics. In accordance with one embodiment of the present disclosure, a sequence set composed of one or more sequences can be previously defined for the discovery request signal. A discovery MS can select a sequence according to a transmission purpose and/or state in the sequence set. For this, transmission purpose and/or state information about at least one sequence included in the sequence set can be preset.

Also, the D2D communication network according to one embodiment of the present disclosure allocates a discovery region 102 for transmitting a discovery signal or a discovery measurement request signal for discovery between MSs with the time period of $T_D$ 112 repeatedly. The discovery region 102 is assigned as a certain time and/or frequency resource within the predetermined period $T_D$ 112. The time period $T_D$ 112 with which the discovery region 102 is repeated is shorter than the time period $T_R$ 110 with which the discovery request region 100 is repeated. For example, the period $T_R$ 110 of the discovery request region 100 can be a value in which the period $T_D$ 112 of the discovery region 102 is multiplied by an integer K ($T_R = K \times T_D$).

In the present specification, before transmitting and receiving a discovery signal or a discovery measurement request signal for discovery between MSs, a discovery MS operates in an active or idle mode according to whether a discovered MS receives a discovery request signal, using a structure of frames in which it transmits a discovery signal for informing that it wants to discover neighbor MSs to the discovered MS to obtain an effect of reducing power consumption.

In the present specification, two methods of performing discovery between MSs using the above-described frame structure are proposed. Firstly, there is a distributed method of performing a discovery process between MSs without control of a central node. Secondly, there is a centralized method of performing a discovery process between MSs according to control of a central node.

Hereinafter, a description will be given for a distributed method according to embodiments of the present disclosure with reference to FIGS. 2 to 6.

Figure 2:
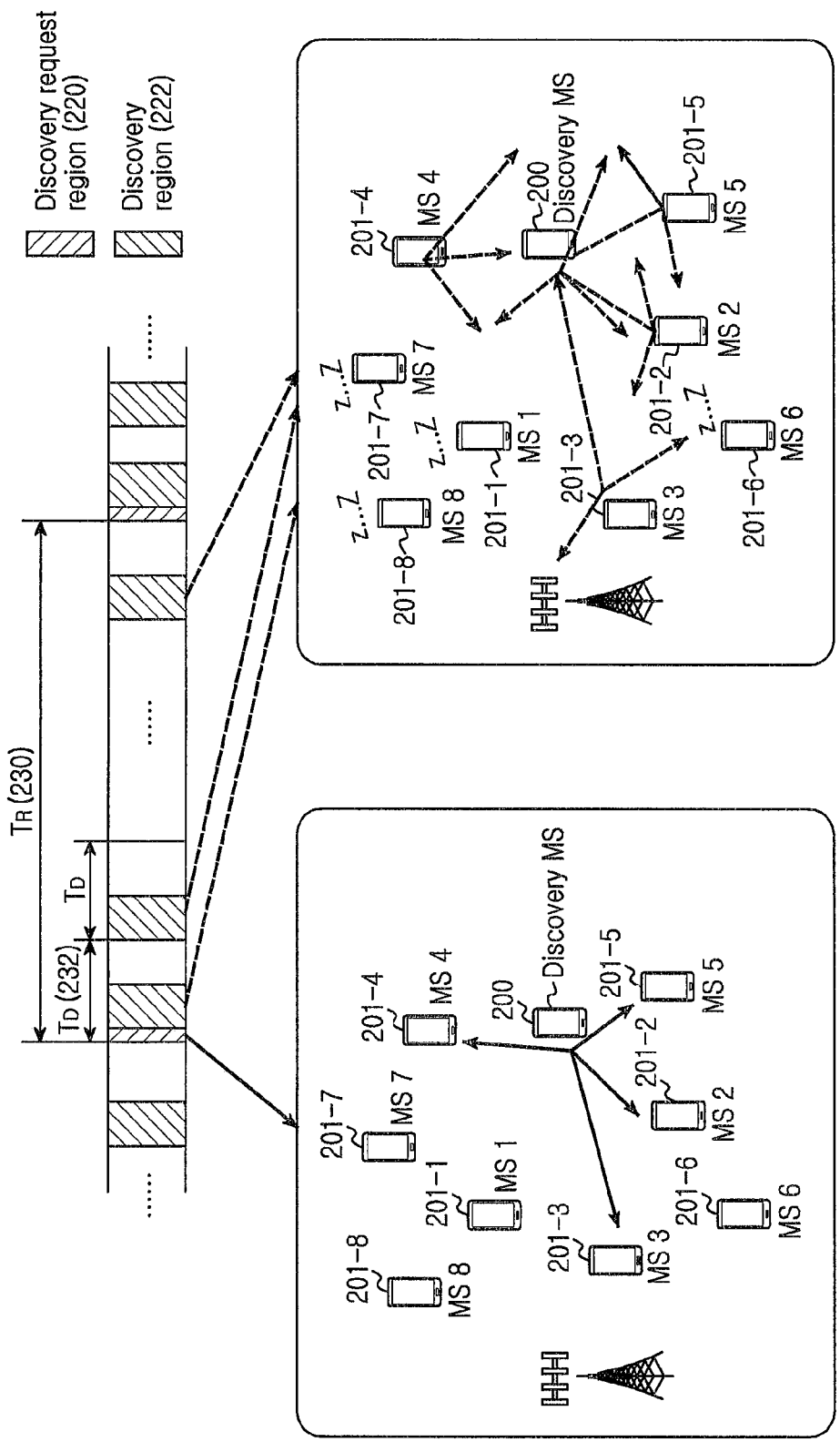
FIG. 2 illustrates a discovery method between MSs in a D2D communication network according to one embodiment of the present disclosure.

FIG. 2 illustrates a discovery operation between MSs in a D2D communication network according to one embodiment of the present disclosure.

Referring to FIG. 2, detecting a situation where it is necessary to discover neighbor MSs, a discovery MS 200 broadcasts a discovery request signal for discovering neighbor MSs in a discovery request region 220 repeated with the period of $T_R$ 230. The discovery MS 200 can listen to at least one discovery region 222 in the corresponding period $T_R$ 230 including discovery request region 220 in which the discovery request signal is transmitted and discovery signals from neighbor MSs are received. Herein, the discovery MS 200 can ascertain the neighbor MSs based on the received discovery signals.

Not detecting a situation where it is necessary to discover neighbor MSs, each of discovered MSs 201-1 to 201-8 does not broadcast a discovery request signal in the discovery request region 220. Each of the discovered MSs 201-1 to 201-8 listens to the discovery request region 220 repeated at the period $T_R$ 230 to receive a discovery request signal from the discovery MS 200.

Each of the discovered MSs 201-2 to 201-5 which is located around the discovery MS 200 among the discovered MSs 201-1 to 201-8 can receive the discovery request signal. Herein, each of the discovered MSs 201-1 to 201-8 can receive a discovery request sequence from the discovery request region 220. When measurement energy for the received discovery request sequence is greater than or equal to a threshold value, each of the discovered MSs 201-1 to 201-8 can determine that a discovery request signal is received and recognize that there is the discovery MS 200 in a neighbor region. Herein, each of the discovered MSs 201-1 to 201-8 can determine a transmission purpose or state of the discovery MS 200 through a sequence index (number) of a detected sequence.

Receiving the discovery request signal, each of the discovered MSs 201-2 to 201-5 can enter an active mode and transmit a discovery signal through the discovery region 222 repeated at the corresponding period $T_R$ 230. That is, each of the discovered MSs 201-2 to 201-5 determines resources for transmitting a discovery signal for informing its existence in the discovery region 222 repeated at the period $T_D$ 232 in a distributed manner and broadcasts a discovery signal through the determined resources in the discovery region 222. Herein, the discovery signal broadcasted from each of the discovered MSs 201-2 to 201-5 can be received at not only the discovery MS 200 but also the neighbor MSs 201-2 to 201-5. That is, each of the discovered MSs 201-2 to 201-5 can listen to the other resources except for its resource for transmitting the discovery signal in the discovery region 222 and receive discovery signals of the other discovered MSs, which are broadcasted through the other resources. Herein, the discovery signal can include discovery information including an ID, state information, and/or service ID, and the like of a discovered MS.

On the other hand, not receiving the discovery request signal, each of the non-discovered MSs 201-1, 201-6, 201-7, and 201-8 enters an idle mode. That is, each of the non-discovered MSs 201-1, 201-6, 201-7, and 201-8 does not listen to the discovery region 222 during the corresponding period $T_R$ 230. After the corresponding period $T_R$ 230 is ended, each of the non-discovered MSs 201-1, 201-6, 201-7, and 201-8 can be converted from the idle mode to the active mode in a time point of a period $T_R$ 230 in which a next discovery request region 220 is located. Therefore, each of the non-discovered MSs 201-1, 201-6, 201-7, and 201-8 can prevent unnecessary power from being consumed.

Figure 3:
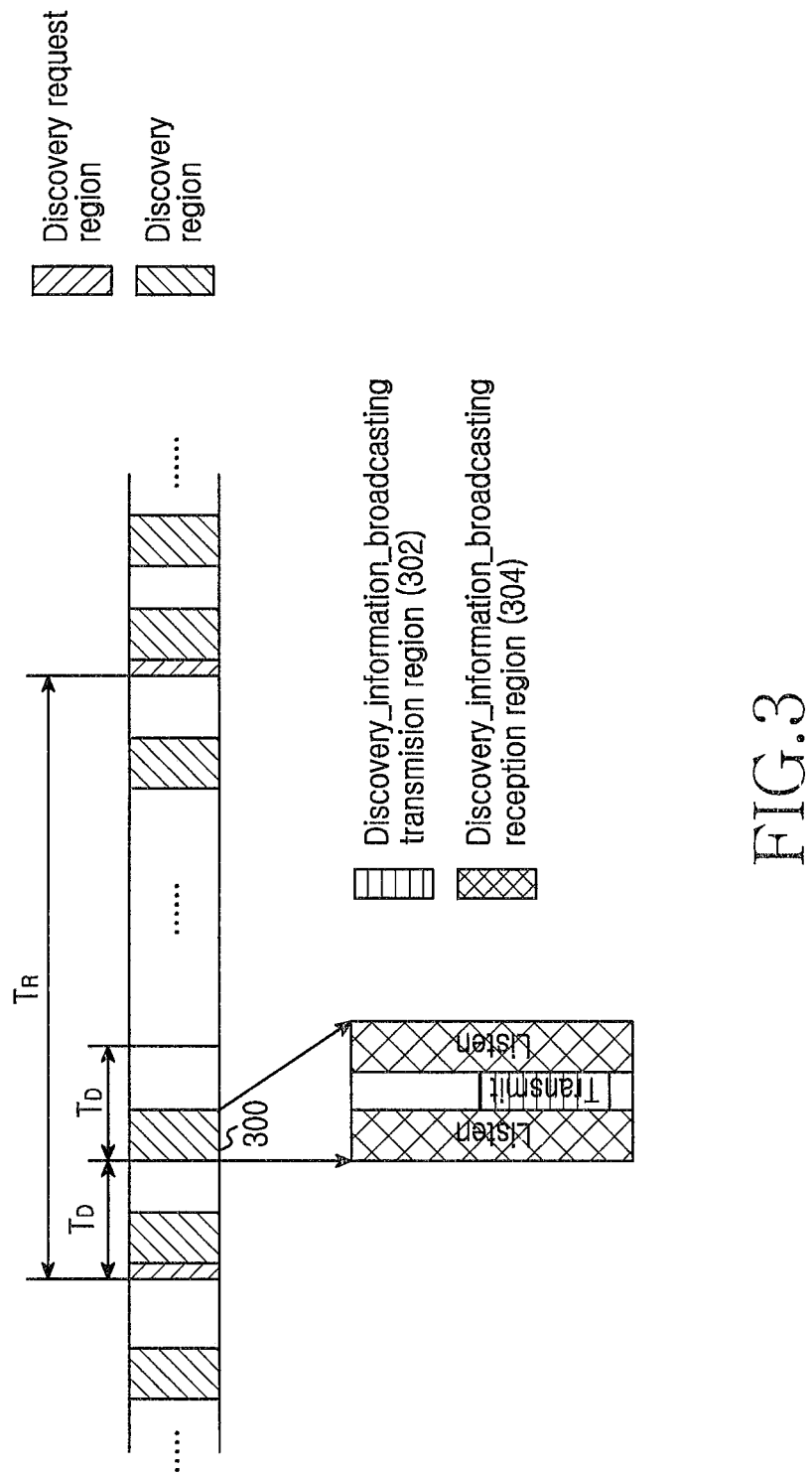
FIG. 3 illustrates a structure of frames for transmitting and receiving discovery information at a discovery MS of a D2D communication network according to one embodiment of the present disclosure.

FIG. 3 illustrates a structure of frames for transmitting and receiving discovery information at a discovery MS of a D2D communication network according to one embodiment of the present disclosure.

Referring to FIGS. 2 and 3, broadcasting the discovery request signal in the discovery request region 220 included in the certain period $T_R$ 230, the discovery MS 200 can transmit its discovery signal from a second discovery region 300 except for a first discovery region among discovery regions 222 included in the corresponding period $T_R$ 230. That is, the discovery MS 200 can determine its discovery signal transmission region, that is, a discovery information broadcasting transmission region 302, based on a result of receiving discovery signals from the discovered MSs 201-2 to 201-5 from the first discovery region. Therefore, the discovery MS 200 can classify each discovery region into the discovery information broadcasting transmission region 302 and a discovery information broadcasting reception region 304 from the second discovery region 300, broadcast its discovery signal in the discovery information broadcasting transmission region 302, and receive discovery signals from the discovered MSs 201-2 to 201-5 in the discovery information broadcasting reception region 304.

Figure 4:
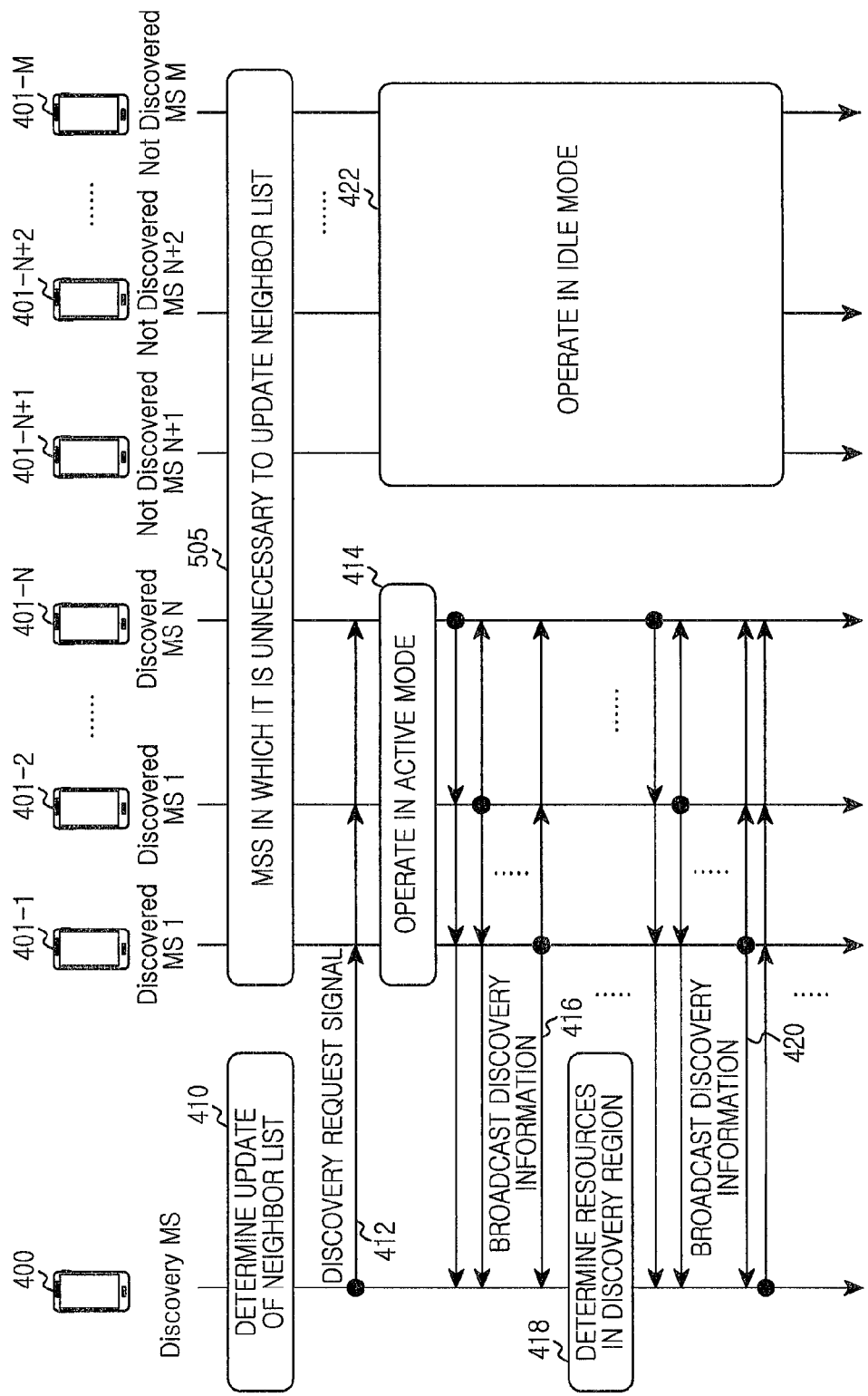
FIG. 4 is a signal sequence diagram illustrating a discovery process between MSs in a D2D communication network according to one embodiment of the present disclosure.

FIG. 4 is a signal sequence diagram illustrating a discovery process between MSs in a D2D communication network according to one embodiment of the present disclosure.

Referring to FIGS. 2 and 4, a discovery MS 400 detects that it is necessary to update a neighbor list and determines that it is necessary to discovery neighbor MSs in step 410. Herein, MSs in which it is unnecessary to update a neighbor list are referred to as discovered MSs 401-1 to 401-M.

The discovery MS 400 broadcasts a discovery request signal for discovering neighbor MSs through the discovery request region 220 repeated at the period $T_R$ 230 in step 412. In accordance with one embodiment of the present disclosure, it is assumed that some 401-1 to 401-N of the discovered MSs 401-1 to 401-M receive the discovery request signal from the discovery MS 400 and the other MSs 401-N+1 to 401-M do not receive the discovery request signal from the discovery MS 400.

Receiving the discovery request signal from the discovery MS 400, the discovered MSs 401-1 to 401-N operates in an active mode in step 414. Receiving the discovery request signal and operating in the active mode, the discovered MSs 401-1 to 401-N can determine resources for transmitting their discovery signal in the discovery region 222, repeated at the period $T_D$ 232 included in the corresponding period $T_R$ 230, in a distributed manner. Herein, the discovered MSs 401-1 to 401-N can determine resources through a well-known method in the distributed manner.

On the other hand, not receiving the discovery request signal from the discovery MS 400, the discovered MSs 401-N+1 to 401-M operates in an idle mode in step 422. Herein, the discovered MSs 401-N+1 to 401-M can operate in an idle mode until a next discovery request region 220 and be converted into the active mode in the next discovery request region 220.

In step 416, each of the discovered MSs 401-1 to 401-N broadcasts discovery information (or a discovery signal) through the determined resources of the first discovery region 222 included in the corresponding period $T_R$ 230. Herein, the discovery information can include an ID, state information, and/or a service ID of a corresponding MS.

The discovery MS 400 can receive the discovery information from each of the discovered MSs 401-1 to 401-N and determine resources for transmitting its discovery signal in the discovery region 222 repeated at the $T_D$ 232 included in the period $T_R$ 230 based on resources which receive the discovery information in step 418.

Thereafter, the discovery MS 400 and each of the discovered MSs 401-1 to 401-N broadcast their discovery information (or their discovery signal) through the resources determined in the discovery region 222 repeated at the $T_D$ 232 included in the period $T_R$ 230 in step 420. Herein, the discovery MS 400 and each of the discovered MSs 401-1 to 401-N can receive discovery information of other MSs through resources which do not transmit their discovery information in the discovery region 222 repeated at the $T_D$ 232 included in the period $T_R$ 230.

Therefore, the discovery MS 400 and each of the discovered MSs 401-1 to 401-N can acquire information about neighbor MSs based on the discovery information received in steps 416 and 420 and update a neighbor list.

Figure 5:
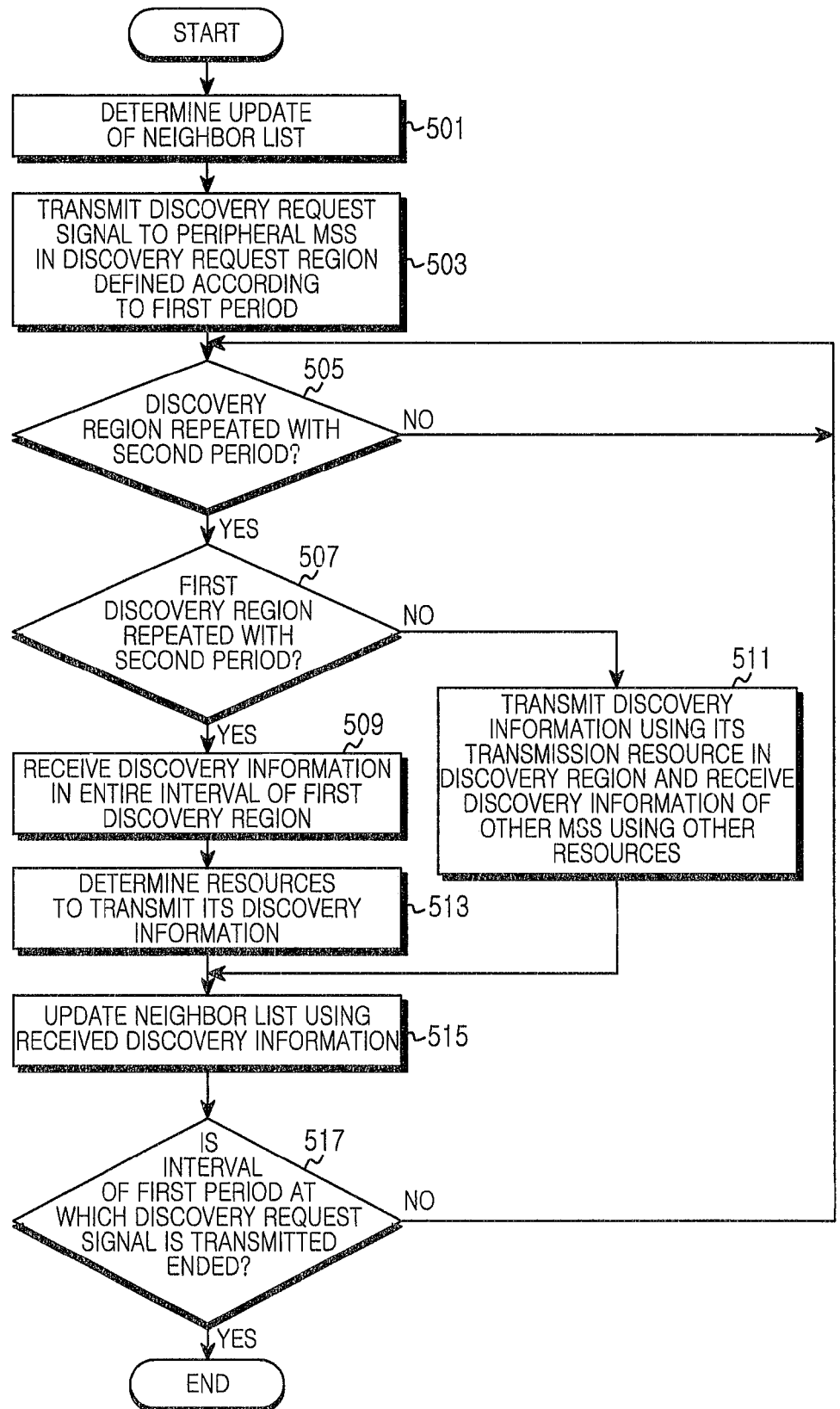
FIG. 5 is a flowchart illustrating a process of discovering neighbor MSs at a discovery MS in a D2D communication network according to one embodiment of the present disclosure.

FIG. 5 is a flowchart illustrating a process of discovering neighbor MSs at a discovery MS in a D2D communication network according to one embodiment of the present disclosure.

Referring to FIGS. 2, 4, and 5, the discovery MS 400 determines that it is necessary to update a neighbor list in step 501. The discovery MS 400 transmits a discovery request signal to peripheral MSs in the discovery request region 220 repeated with a first period (that is, the period $T_R$ 230) in step 503. That is, the discovery MS 400 can broadcast the discovery request signal to neighbor MSs which are located around it to inform that it wants to discover the neighbor MSs. Herein, the discovered MSs 401-1 to 401-N which are located in a transmission region of the discovery MS 400 can receive the discovery request signal from the discovery MS 400. The discovered MSs 401-N+1 to 401-M which are located out of the transmission region of the discovery MS 400 may not receive the discovery request signal from the discovery MS 400.

Thereafter, the discovery MS 400 checks whether each of resources included in the first period at which the discovery request signal is transmitted corresponds to the discovery region 222 repeated with a second period (that is, the period $T_D$ 232). The discovery MS 400 checks whether the corresponding resource is a first discovery region with the second period, when each of the resources corresponds to the discovery region repeated with the second period. For example, the discovery MS 400 checks whether the corresponding resource is a discovery region which is located in the first portion after the discovery request region 220 where the discovery request signal is transmitted in the frame structure shown in FIG. 2.

If the corresponding resource corresponds to the first discover region according to the second period, the discovery MS 400 receives discovery information from neighbor MSs (or discovered MSs) through the entire interval of the first discovery region in step 509. The discovery MS 400 determines a resource region to transmit its discovery information in the discovery region in step 513. For example, the discovery region 400 can determine a resource region which is not received by neighbor MSs in the first discover region as a resource region to transmit its discovery information. Thereafter, the discovery MS 400 updates a neighbor list using the discovery information received from neighbor MSs in step 515 and proceeds to step 517.

On the other hand, when the corresponding resource does not correspond to the first discovery region according to the second period, the discovery MS 400 transmits its discovery information using its discovery information transmission resource in the corresponding discovery region, listens to the other resources in the corresponding discovery region, and receives discovery information from neighbor MSs in step 511. For example, as shown in FIG. 3, the discovery MS 400 can classify each discovery region into a discovery information broadcasting transmission region 302 and a discovery information broadcasting reception region 304 from the second discovery region 300 among the discovery regions 222 included in the corresponding period $T_R$ 230, broadcast its discovery signal in the discovery information broadcasting transmission region 302, and receive discovery signals from neighbor MSs in the discovery information broadcasting reception region 304. Neighbor MSs which transmit their discovery signals in the first discovery region in the corresponding period $T_R$ 230 can be discovered MSs. Neighbor MSs which transmit their discovery signals in the other discovery regions except for the first discovery region in the corresponding period $T_R$ 230 can be discovered MSs or other discovery MSs.

Thereafter, the discovery MS 400 updates the neighbor list using the discovery information received from the neighbor MSs in step 515 and proceeds to step 517.

The discovery MS 400 checks whether the interval of the corresponding first period at which the discovery request signal is transmitted is ended in step 517. When a next discovery request region repeated with the first period is started, the discovery MS 400 can determine that the interval of the corresponding first period at which the discovery request signal is transmitted is ended. When the interval of the corresponding first period at which the discovery request signal is transmitted is not ended, the discovery MS 400 returns to step 505 and performs the processing from step 505 again. When the interval of the corresponding first period at which the discovery request signal is transmitted is ended, the discovery MS 400 ends the operation procedure according to one embodiment of the present disclosure.

Herein, the description was given for updating the neighbor list whenever the discovery MS receives the discovery information through the discovery region according to one embodiment of the present disclosure. However, in accordance with another embodiment of the present disclosure, the discovery MS does not update the neighbor list whenever receiving the discovery information. The discovery MS can listen to all the discovery regions 222 included in the period $T_R$ 230 and update the neighbor list. Also, the discovery MS can include all neighbor MSs corresponding to the received discovery signals in the neighbor list. The discovery MS can select at least one neighbor MS based on signal quality among the neighbor MSs corresponding to the received discovery signals and include at least only the one neighbor MS in the neighbor list.

Figure 6:
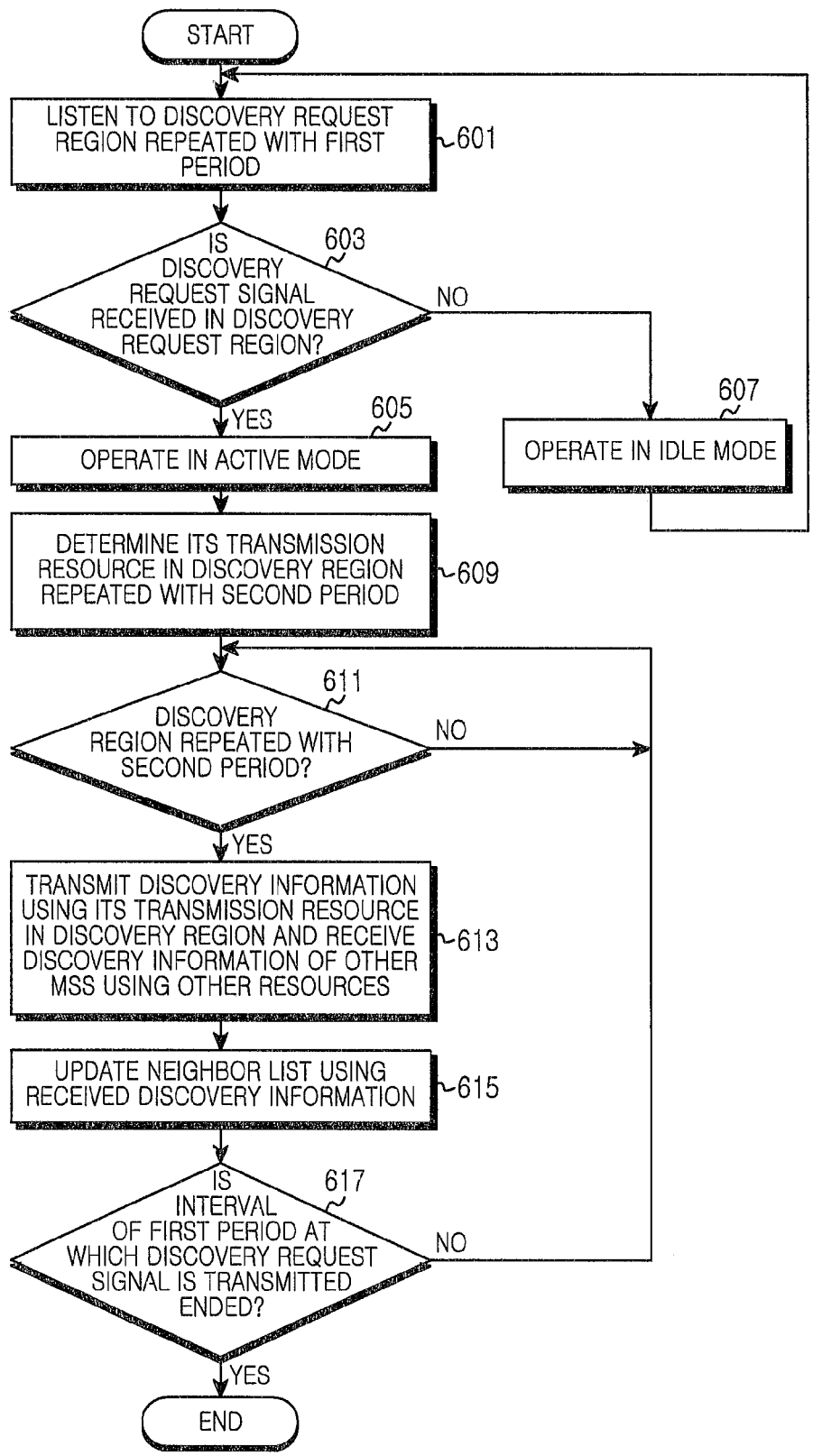
FIG. 6 is a flowchart illustrating an operation process of a discovered MS in a D2D communication network according to one embodiment of the present disclosure.

FIG. 6 is a flowchart illustrating an operation process of a discovered MS in a D2D communication network according to one embodiment of the present disclosure.

Herein, the discovered MS means one of MSs 401-1 to 401-M which do not detect the necessity to update a list of its neighbor MSs.

Referring to FIGS. 2 and 6, the discovered MS listens to the discovery request region 220 repeated with the period $T_R$ 230 in step 601. The discovered MS checks whether a discovery request signal is received through the discovery request region 220 in step 603.

Not receiving the discovery request signal through the discovery request signal 220, the discovered MS operates in an idle mode in step 607 and returns to step 601. For example, the discovered MS operates in the idle mode until a next discovery request region 220. The discovered MS can be converted into an active mode in the next discovery request region 220 and listen to the next discovery request region 220.

On the other hand, receiving the discovery request signal through the discovery request region 220, the discovered MS operates in the active mode in step 605. For example, the discovered MS listens to discovery regions included in an interval of the corresponding first period at which the discovery request signal is received and holds the active mode to transmit a discovery signal through the discovery region.

The discovered MS determines its transmission resource in the discovery region 222 repeated with a second period in step 609. The discovery region 222 repeated with the second period can be repeated with the second period in the corresponding first period at which the discovery request signal is received. Herein, the discovered MS can determine a resource for transmitting a discovery signal in the discovery region 222 in a distributed manner through the well-known method.

Thereafter, the discovered MS checks whether each resource included in the first period at which the discovery request signal is received corresponds to the discovery region 222 repeated with the second period (the period $T_D$ 232). If each resource corresponds to the discovery region 222 repeated with the second period, the discovered MS transmits its discovery information using its discovery information transmission resource in the corresponding discovery region 222, listens to the other resources in the corresponding discovery region 222, and receives discovery information from neighbor MSs in step 613.

Thereafter, the discovered MS updates a neighbor list using the discovery information received from the neighbor MSs in step 615 and proceeds to step 617.

The discovered MS checks whether the interval of the corresponding first period at which the discovery request signal is received is ended in step 617. When a next discovery request region repeated with the first period is started, the discovered MS can determine that the interval of the corresponding first period at which the discovery request signal is received is ended. When the interval of the corresponding first period at which the discovery request signal is received is not ended, the discovered MS returns to step 611 and performs the processing from step 611 again. When the interval of the corresponding first period at which the discovery request signal is received is ended, the discovered MS ends the operation procedure according to one embodiment of the present disclosure.

Hereinafter, a description will be given for a centralized method according to another embodiment of the present disclosure with reference to FIGS. 7 to 11. In accordance with another embodiment of the present disclosure, for convenience of description, it is assumed that a central node which controls resource allocation of MSs is a BS. However, the central node which controls the resource allocation of the MSs can be an MS or another network node.

Figure 7:
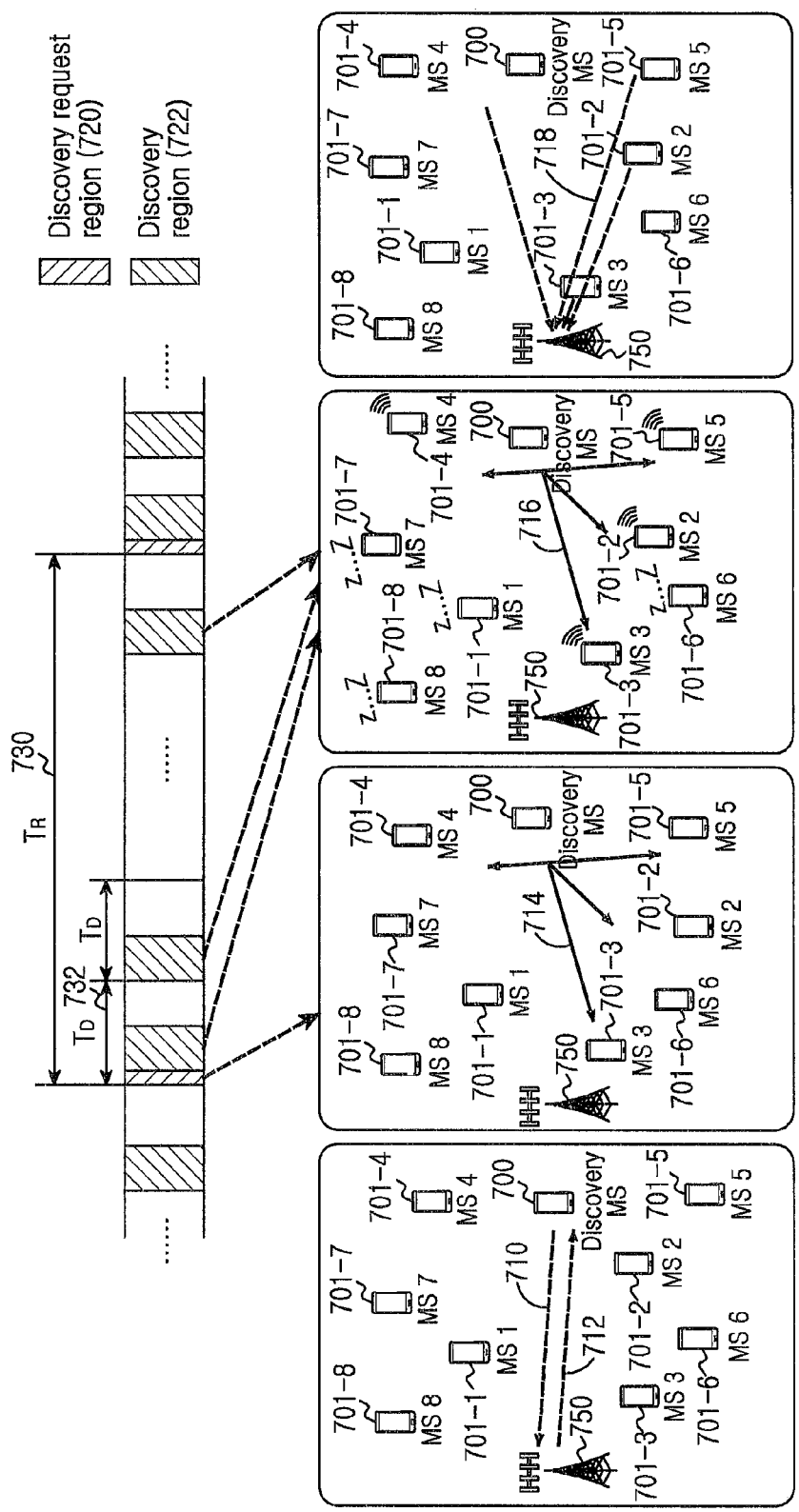
FIG. 7 illustrates a discovery method between MSs using a central node in a D2D communication network according to another embodiment of the present disclosure.

FIG. 7 illustrates a discovery method between MSs using a central node in a D2D communication network according to another embodiment of the present disclosure.

Referring to FIG. 7, detecting a situation where it is necessary to discover neighbor MSs, a discovery MS 700 transmits a neighbor list update request message to a BS 750 through a link between it and the BS 750 which is a central node (see a reference number 710). The discovery MS 700 receives resource allocation information about a resource region to transmit a discover measurement request signal from the BS 750 (see a reference number 712). Herein, information about the resource region to transmit the discovery measurement request signal can be a specific time and/or frequency resource in a discovery region 722 repeated at a period $T_D$ 732 included in a corresponding period $T_R$ 730.

The discovery MS 700 broadcasts a discovery request signal through a discovery request region repeated at the period $T_R$ 730 (see a reference number 714). Herein, not detecting the situation where it is necessary to discover neighbor MSs, each of discovered MSs 701-1 to 701-8 does not broadcast a discovery request signal in the discovery request region 720. Each of the discovered MSs 7014 to 701-8 listens to the discovery request region 720 repeated at the period $T_R$ 730 to receive the discovery request signal from the discovery MS 700. The discovered MSs 701-2 to 702-5 which are located around the discovery MS 700 among the discovered MSs 701-1 to 701-8 can receive the discovery request signal. Herein, each of the discovered MSs 701-1 to 701-8 can receive a discovery request sequence from the discovery request region 720. When measurement energy for the received discovery request sequence is greater than or equal to a threshold value, each of the discovered MSs 701-1 to 701-8 can determine that the discovery request signal is received and recognize that there is the discovery MS 700 in a neighbor region. Herein, each of the discovered MSs 701-1 to 701-8 can determine a transmission purpose or state of the discovery MS 700 through a sequence index (number) of the detected sequence.

Also, the discovery MS 700 broadcasts a discovery measurement request signal through a discovery region 722 indicated by the resource allocation information received from the BS 750 among the discovery regions 722 repeated with the period $T_D$ 732. Receiving the discovery request signal, each of the discovered MSs 701-2 to 701-5 can enter an active mode and receive the discovery measurement request signal through the discovery region 722 repeated with the corresponding period $T_R$ 730. On the other hand, not receiving the discovery request signal, each of the non-discovered MSs 701-1 and 701-6 to 701-8 enters an idle mode and does not listen to the discovery region 722 included in the corresponding period $T_R$ 730. Herein, entering the idle mode, each of the non-discovered MSs 701-1 and 701-6 to 701-8 can be converted into an active mode in a start time point of a period $T_R$ 730 including a next discovery request region 720 after the corresponding period $T_R$ 730 is ended. Therefore, each of the non-discovered MSs 701-1 and 701-6 to 701-8 can prevent power from being consumed unnecessarily.

Receiving the discovery measurement request signal, each of the discovered MSs 701-2 to 701-5 transmits its discovery measurement report message indicating the result of measuring the discovery measurement request signal to the BS 750 (see a reference number 718). Herein, the discovery measurement report message can include information indicating quality of the received discovery measurement request signal such as an ID of a discovered MS, a signal to interference ratio, and/or received signal strength. Herein, the discovery measurement report signal can be transmitted to the BS 750 through a resource separately allocated from the BS 750 without competition among the discovered MSs 701-2 to 701-5.

The BS 750 can update a neighbor list for the discovery MS 700 based on the discovery measurement report messages received from each of the discovered MSs 701-2 to 701-5. Herein, the BS 750 can include all discovered MSs which transmit the discovery measurement report messages in the neighbor list of the discovery MS 700. Also, the BS 750 can select at least one discovered MS based on signal quality included in the discovery measurement report messages among all the discovered MSs which transmit the discovery measurement report messages and include only the selected discovered MSs in the neighbor list of the discovery MS 700.

Figure 8:
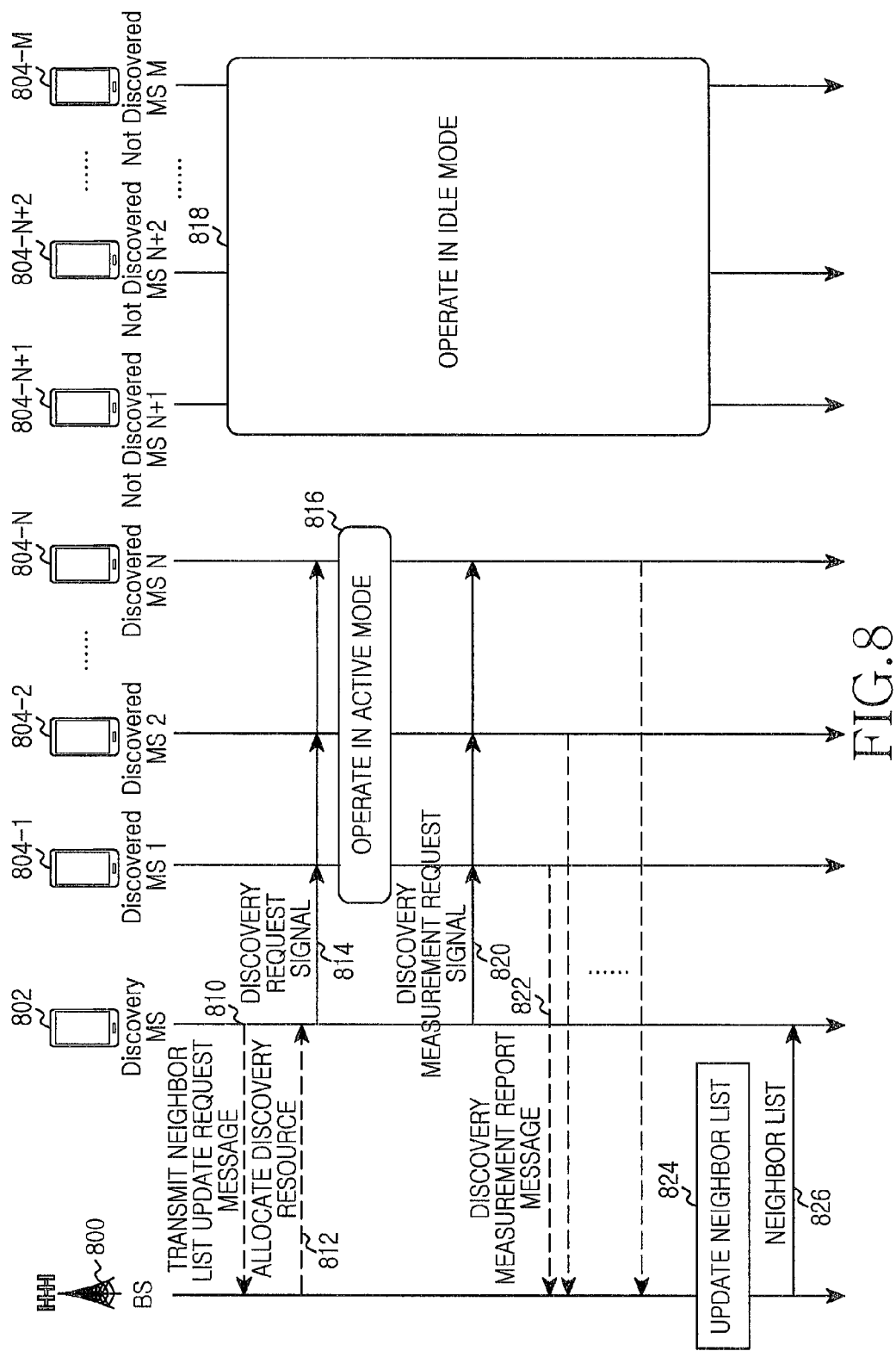
FIG. 8 is a signal sequence diagram illustrating a discovery process between MSs according to control of a central node in a D2D communication network according to another embodiment of the present disclosure.

FIG. 8 is a signal sequence diagram illustrating a discovery process between MSs according to the control of a central node in a D2D communication network according to another embodiment of the present disclosure.

Referring to FIGS. 7 and 8, detecting a situation where it is necessary to discover neighbor MSs, a discovery MS 802 transmits a neighbor list update request message to a BS 800 in step 810. The BS 800 receives the neighbor list update request message from the discovery MS 802 and allocates a resource to transmit a discovery measurement request signal to the discovery MS 802 in step 812. Herein, the resource to transmit the discovery request signal can be a specific time and/or frequency resource in the discovery request region repeated at the period $T_R$ 730. Also, the resource to transmit the discovery measurement request signal can be a specific time and/or frequency resource in the discovery region 722 repeated with the period $T_D$ 732 included in the corresponding period $T_R$ 730.

The discovery MS 802 broadcasts a discovery request signal through the discovery request region 720 repeated at the period $T_R$ 730 in step 814. Herein, not detecting the situation where it is necessary to discover the neighbor MSs, each of discovered MSs 804-1 to 804-M does not broadcast the discovery request signal in the discovery request region 720 and listen to the discovery request region 720 repeated with the period $T_R$ 730. Each of the discovered MSs 804-1 to 804-N which is located in a transmission region of the discovery MS 802 among the discovered MSs 804-1 to 804-M can receive the discovery request signal. Each of the non-discovered MSs 804-N+1 to 804-M which is located out of the transmission region of the discovery MS 802 among the discovered MSs 804-1 to 804-M may not receive the discovery request signal. Therefore, each of the non-discovered MSs 804-N+1 to 804-M operates in an idle mode in step 818. Each of the non-discovered MSs 804-N+1 to 804-M can operate in the idle mode until a next discovery request region 720 and be converted into an active mode in the next discovery request region 720.

Receiving the discovery request signal from the discovery MS 802, each of the discovered MSs 8044 to 804-N operates in the active mode in step 816. Receiving the discovery request signal and operating in the active mode, each of the discovered MSs 804-1 to 804-N can listen to the discovery region 722 repeated with the period $T_D$ 732 included in the corresponding period $T_R$ 730.

The discovery MS 802 broadcasts a discovery measurement request signal through the discovery region 722 allocated from the BS 750 among the discovery region 722 repeated with the period $T_D$ 732. Herein, Operating in the active mode, each of the discovered MSs 804-1 to 804-N can receive the discovery measurement request signal through the discovery region 722 repeated at the period $T_R$ 730. On the other hand, operating in the idle mode, each of the non-discovered MSs 804-N+1 to 804-M does not listen to all resource regions included in the corresponding period TR 730.

Receiving the discovery measurement request signal, each of the discovered MSs 804-1 to 804-N transmits a discovery measurement report message indicating a result of measuring the discovery measurement request signal to the BS 800 in step 822. Herein, the discovery measurement report message can include information indicating quality of the received discovery measurement request signal such as an ID of a discovered MS, a signal to interference ratio, and/or received signal strength. Also, each of the discovered MSs 804-1 to 804-N can transmit the discovery measurement report signal to the BS 800 by being allocated with a separate resource from the BS 800 without competition among the discovered MSs 804-1 to 804-N to transmit the discovery measurement report signal.

The BS 800 updates a neighbor list for the discovery MS 802 based on the discovery measurement report messages received from the discovered MSs 804-1 to 804-N in step 824 and transmits the updated neighbor list to the discovery MS 802 in step 826.

Figure 9:
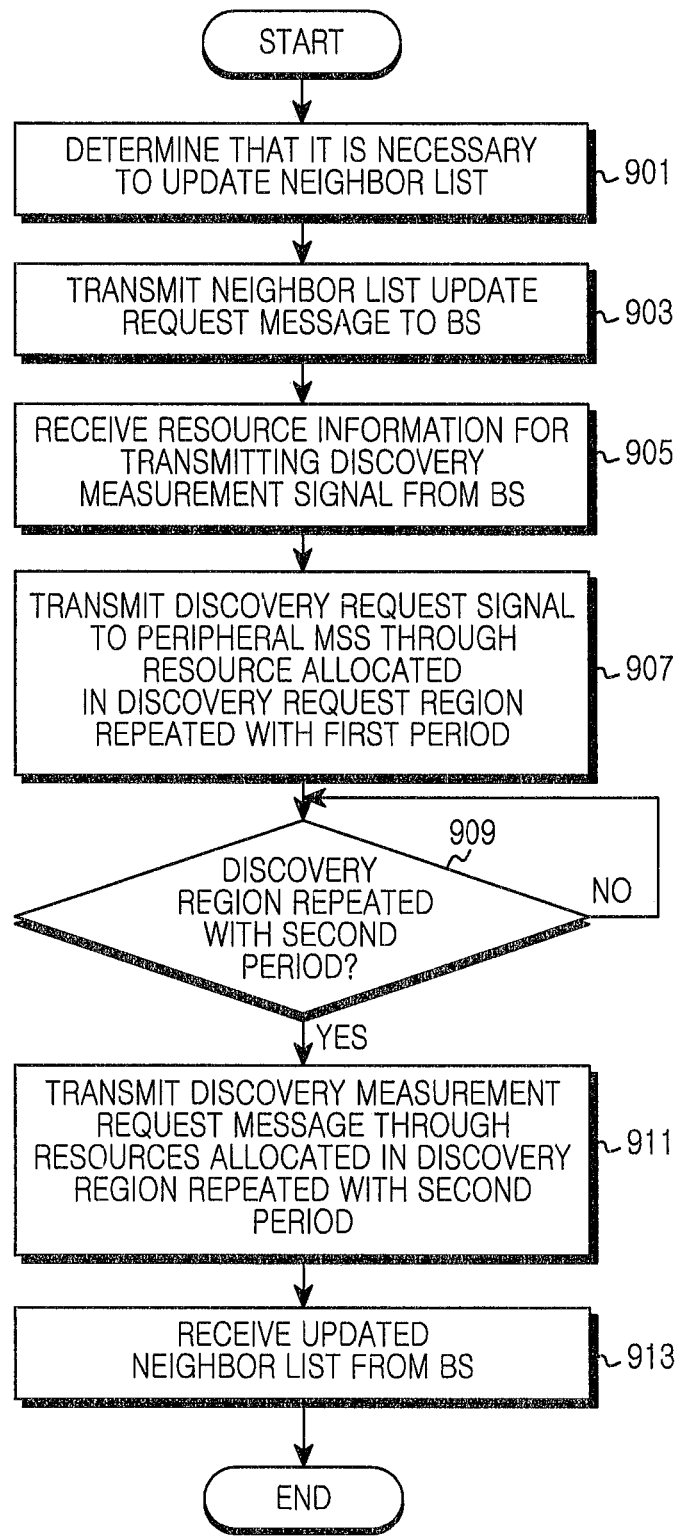
FIG. 9 is a flowchart illustrating a process of discovering neighbor MSs at a discovery MS in a D2D communication network according to another embodiment of the present disclosure.

FIG. 9 is a flowchart illustrating a process of discovering neighbor MSs at a discovery MS in a D2D communication network according to another embodiment of the present disclosure.

Referring to FIGS. 7 to 9, the discovery MS 802 determines that it is necessary to update a neighbor list in step 901. The discovery MS 802 transmits a neighbor list update request message to the BS 800 in step 903. Thereafter, the discovery MS 802 receives information about a resource to transmit a discovery measurement request signal from the BS 800 in step 905. Herein, the resource to transmit the discovery measurement request signal can be a specific time and/or frequency resource in the discovery region 722 repeated at the period $T_D$ 732 included in the corresponding period $T_R$ 730.

The discovery MS 802 broadcasts a discovery request signal through the discovery request region 720 allocated from the BS 800 among the discovery request regions 720 repeated at a first period (that is, the period $T_R$ 730) in step 907.

Thereafter, the discovery MS 802 checks whether each resource included in the first period at which the discovery request signal is transmitted corresponds to the discovery region 722 repeated with a second period (that is, the period $T_D$ 732) in step 909. If each resource corresponds to the discovery region 722 repeated with the second period, the discovery MS 802 broadcasts a discovery measurement request message through the resource allocated from the BS 800 in the discover region 722 repeated with the second period.

Thereafter, the discovery MS 802 receives the updated neighbor list from the BS 800 in step 913 and ends the algorithm of FIG. 9.

Figure 10:
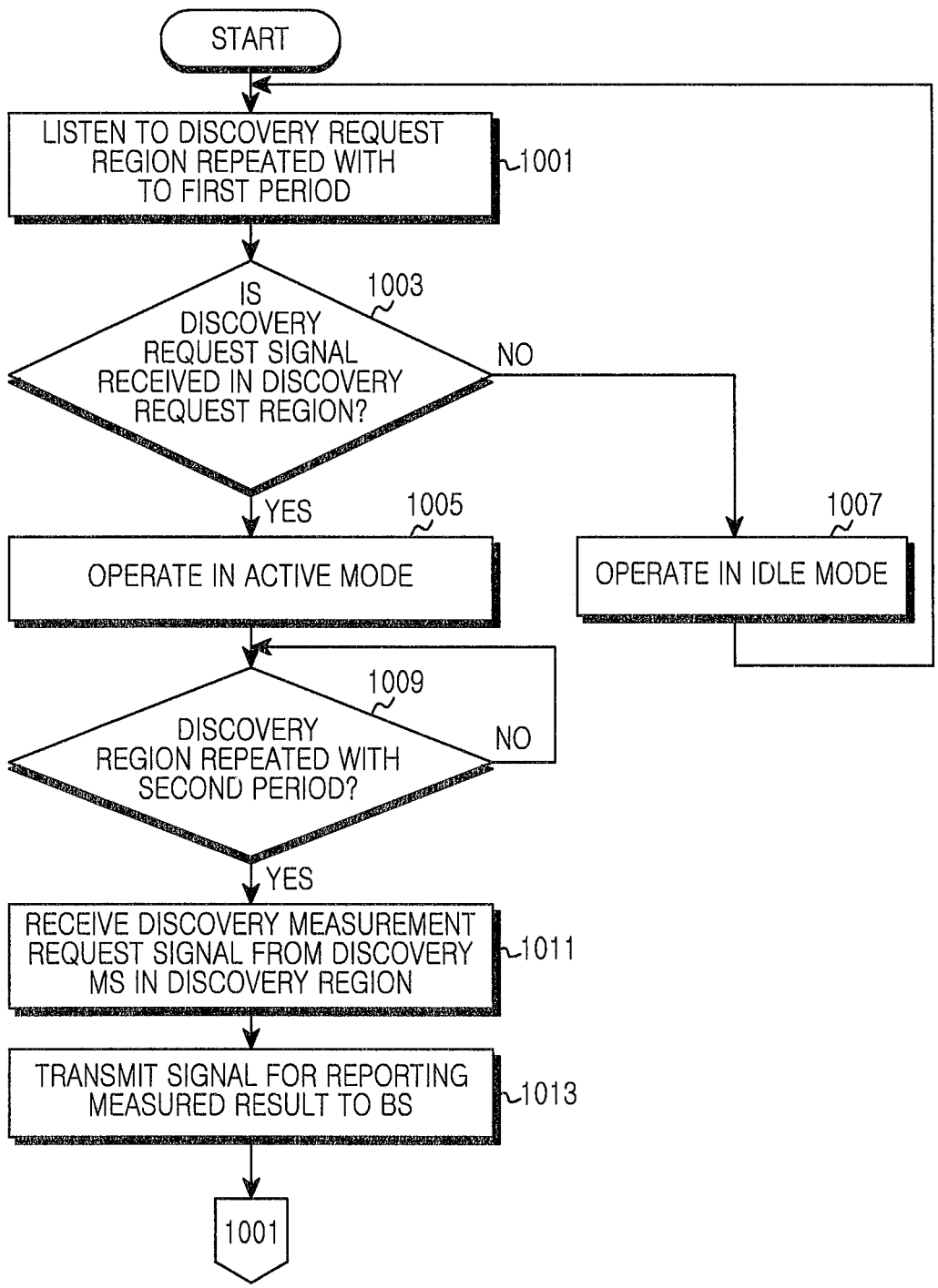
FIG. 10 is a flowchart illustrating an operation process of a discovered MS in a D2D communication network according to another embodiment of the present disclosure.

FIG. 10 is a flowchart illustrating an operation process of a discovered MS in a D2D communication network according to another embodiment of the present disclosure.

Referring to FIGS. 7, 8, and 10, at least one of the discovered MSs 804-1 to 804-M listens to the discovery request region 720 repeated with a first period (that is, the period $T_R$ 730) in step 1001. The discovered MS checks whether a discovery request signal is received through the discovery request region 720 in step 1003.

If the discovery request signal is not received through the discovery request region 720, the discovered MS operates in an idle mode in step 1007 and returns to step 1001. For example, the discovered MS can operate in the idle mode until a next discovery request region 720, be converted into an active mode in the next discovery request region 720, and listen to the next discovery request region 720.

On the other hand, when the discovery request signal is received through the discovery request region 720, the discovered MS operates in an active mode in step 1005. For example, the discovered MS holds the active mode to listen to the discovery regions 722 included in an interval of the corresponding first period at which the discovery request signal is received.

Thereafter, the discovered MS checks whether each resource included in the first period at which the discovery request signal is received corresponds to the discovery region 722 repeated with a second period (that is, the period $T_D$ 732) in step 1009. If each resource corresponds to the discovery region repeated with the second period, the discovered MS listens to the discover region 722 repeated with the second period and receive a discovery measurement request signal from the discovery MS 800 in step 1011.

Thereafter, the discovered MS transmits a discovery measurement report message indicating a result of measuring the received discovery measurement request signal to the BS 800 in step 1013. Herein, the discovery measurement report message can include information indicating quality of the received discovery measurement request signal such as an ID of a discovered MS, a signal to interference ratio, and/or received signal strength. Also, the discovered can transmit the discovery measurement report signal to the BS 800 by being allocated with a separate resource from the BS 800 without competition among the discovered MSs 804-1 to 804-N to transmit the discovery measurement report signal.

Therefore, the discovered MS returns to step 1001 and performs the processing from step 1001 again.

Figure 11:
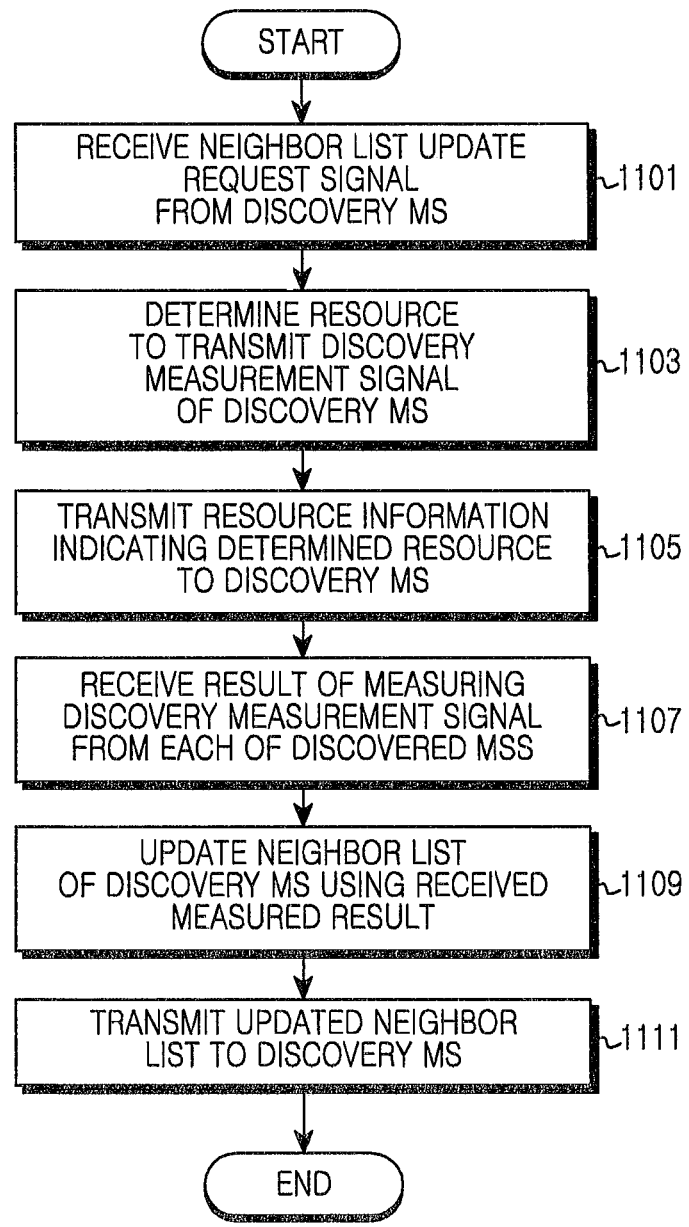
FIG. 11 is a flowchart illustrating an operation process of a central node in a D2D communication network according to another embodiment of the present disclosure.

FIG. 11 is a flowchart illustrating an operation process of a central node in a D2D communication network according to another embodiment of the present disclosure.

Referring to FIGS. 7, 8, and 11, the BS 800 which is the central node receives a neighbor list update request signal from the discovery MS 802 in step 1101.

Thereafter, the BS 800 determines a resource to transmit a discovery measurement request signal to the discovery MS 802 in step 1103. The BS 800 transmits resource information indicating the determined result to the discovery MS 802 in step 1105. Herein, the BS 800 can determine a specific time and/or frequency resource in the discovery region 722 repeated with the period $T_D$ 732 included in the corresponding period $T_R$ 730 as the resource for transmitting the discovery measurement request signal.

Thereafter, the BS 800 can receive a discovery measurement report message indicating a result of measuring a discovery measurement request signal from each of discovered MSs in step 1107. Herein, the discovery measurement report message can include information indicating quality of the received discovery measurement request signal such as an ID of a discovered MS, a signal to interference ratio, and/or received signal strength. The BS 800 can allocate separate resources for transmitting discovery measurement report messages of discovered MSs and receive discovery measurement report messages through the allocated separate resources.

The BS 800 updates a neighbor list of the discovery MS using the received discovery measurement report messages in step 1109. The BS 800 can include all discovered MSs which transmit the discovery measurement report messages in the neighbor list of the discovery MS 802. Also, the BS 800 can select at least one discovered MS based on signal quality included in the discovery measurement report messages among the discovered MSs which transmit the discovery measurement report messages, and include only the selected discovered MS in the neighbor list of the discovery MS 802.

Thereafter, the BS 800 transmits the updated neighbor list to the discovery MS 802 in step 1111 and ends the operation procedure according to another embodiment of the present disclosure.

Figure 12:
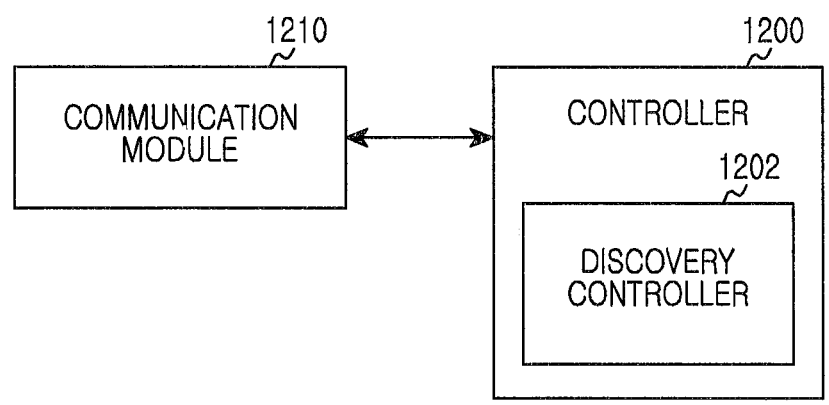
FIG. 12 is a block diagram illustrating configuration of an MS according to one embodiment of the present disclosure.

FIG. 12 is a block diagram illustrating configuration of an MS according to one embodiment of the present disclosure.

Referring to FIG. 12, the MS can include a controller 1200 and a communication module 1210.

The controller 1200 controls and processes an overall operation of the MS. Particularly, a discovery controller 1202 included in the controller 1200 controls and processes an operation for discovering neighbor MSs based on a frame structure shown in FIG. 1. In more detail, the discovery controller 1202 detects whether it is necessary to update a neighbor list. When it is necessary to update the neighbor list, the discovery controller 1202 can perform the operation of the discovery MS, which is described in FIGS. 2 to 11. For one example, the discovery controller 1202 can control and processes a function for broadcasting a discovery request signal in a discovery request region repeated with the predetermined period $T_R$. For another example, the discovery controller 1202 can control and process a function for broadcasting or receiving a discovery signal in a discovery region repeated with the predetermined period $T_D$, or a function for broadcasting a discovery measurement request signal. Also, when it is unnecessary to update the neighbor list, the discovery controller 1202 can perform operations of discovered MSs, which are described in FIGS. 2 to 11. For example, the discovery controller 1202 can control and process a function for receiving a discovery request signal in a discovery request region repeated with the predetermined period $T_R$. When the discovery request signal is not received, the discovery controller 1202 controls and processes a function for operating in an idle mode until a next discovery request region. When the discovery request signal is received, the discovery controller 1202 controls and processes a function for operating in an active mode continuously until the next discovery request region. Herein, the discovery controller 1202 can control and processes a function for broadcasting or receiving a discovery signal in a discovery region repeated with the predetermined period $T_D$, or a function for receiving a discovery measurement request signal.

Also, when a distributed method is supported, the discovery controller 1202 controls and processes a function for competing with other MSs and determining its transmission resources in a distributed manner. When a centralized method is supported, the discovery controller 1202 controls and processes a function for requesting a central node to allocate transmission resources and receive its transmission resource.

The communication module 1210 transmits and receives signals with another MS or the central node according to the control of the controller 1200. For example, the communication module 1210 broadcasts or receives a discovery request signal, a discovery signal, and/or a discovery measurement request signal based on the frame structure shown in FIG. 1. Also, the communication module 1210 can transmit a neighbor list update request message to the central node and receive resource allocation information about transmission resources, or transmit a discovery measurement report message. Also, the communication module 1210 can receive an updated neighbor list from the central node.

Figure 13:
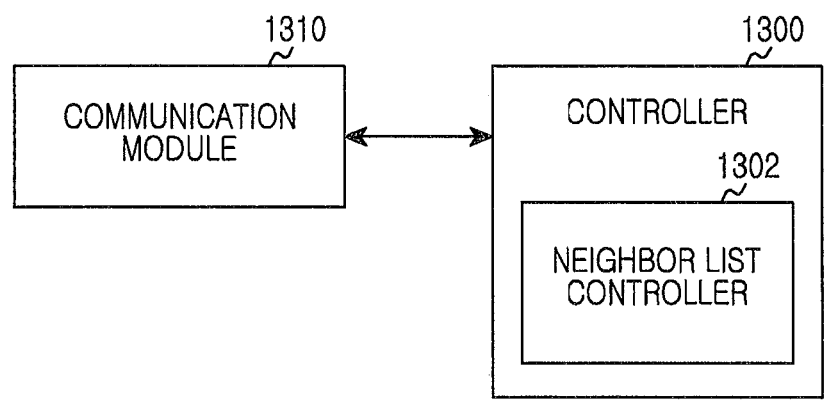
FIG. 13 is a block diagram illustrating configuration of a central node according to one embodiment of the present disclosure.

FIG. 13 is a block diagram illustrating configuration of a central node according to one embodiment of the present disclosure.

Referring to FIG. 13, the central node can include a controller 1300 and a communication module 1310.

The controller 1300 controls and processes an overall operation of the central node. Particularly, a neighbor list controller 1302 included in the controller 1300 controls and processes a function for allocating resources for discovering neighbor MSs based on the frame structure shown in FIG. 1. In more detail, when a signal for requesting update of a neighbor list is received from a discovery MS, the neighbor list controller 1302 allocates, as shown in FIGS. 7 to 11, resources for transmitting a discovery request signal and a discovery measurement request signal of the discovery MS. The neighbor list controller 1302 controls and processes a function for updating a neighbor list based on discovery measurement report messages received from discovered MSs and transmitting the updated neighbor list to the discovery MS.

The communication module 1310 transmits and receives signals with the discovery MS and discovered MSs according to control of the controller 1300. For example, the communication module 1310 can receive a neighbor list update request message from the discovery MS, transmit resource allocation information about transmission resources, and receive discovery measurement report messages from discovered MSs. Also, the communication module 1310 can transmit an updated neighbor list to the discovery MS.

Figure 14:
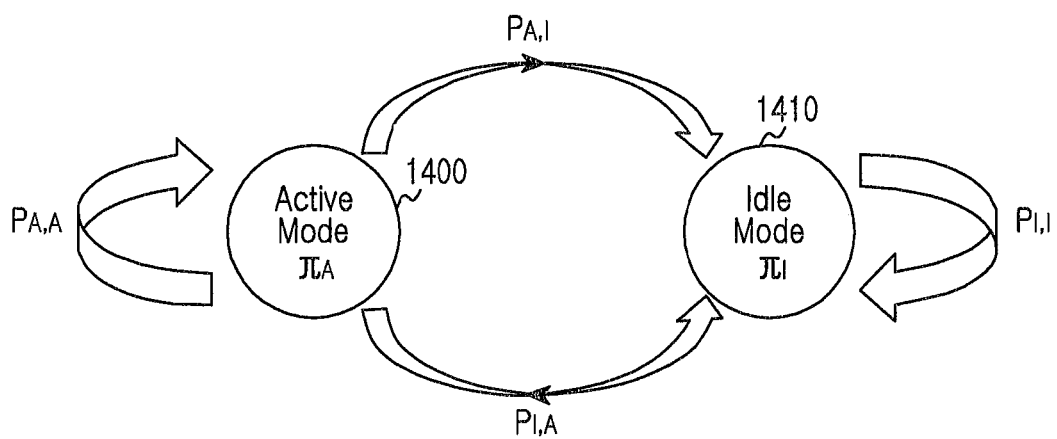
FIG. 14 illustrates a status transition diagram of a discovered MS according to one embodiment of the present disclosure.

FIG. 14 illustrates a status transition diagram of a discovered MS according to one embodiment of the present disclosure.

Referring to FIG. 14, in accordance with one embodiment of the present disclosure, the discovered MS operates in an active mode 1400 or an idle mode 1410 based on a discovery request region and whether a discovery request signal is received. For one example, receiving the discovery request signal in the discovery request region repeated at a period $T_R$, the discovered MS operates in the active mode 1400. For another example, not receiving the discovery request signal in the discovery request region repeated at the period $T_R$, the discovered MS operates in the idle mode 1410.

In order to analyze performance of the method proposed in the present specification, it is assumed that discovery MSs in which it is necessary to discover neighbor MSs are generated by a Poisson distribution of an average λ (number/second). In the present specification, it is assumed that a period $T_R$ at which a discovery request region is repeated and a period $T_D$ at which a discovery region is repeated have relation of $T_R = K \cdot T_D$. Also, a time interval of a discovery request region repeated with the period $T_R$ is denoted as $t_R$. A time interval of a discovery region repeated at the period $T_D$ is denoted as $t_D$.

In the above-described system, a probability that n MSs will receive a discovery request signal during a time interval T can be calculated using Equation 1 shown below.

$$f_N(n) = \frac{q^n}{n!} \exp(-q) \qquad \text{[Equation 1]}$$

Herein, q denotes λ·A·T. Herein, A denotes a size of a region or cell which can receive a discovery request signal.

Also, a mode transition probability (or a status transition probability) of an MS shown in FIG. 14 can differ according to distribution of discovery request MSs.

To shift an MS from the active mode to the active mode is performed when the MS receives a discovery request signal from at least one discovery MS in a current interval $T_R$ which is in the active mode. A probability $P_{A,A}$ that an MS will be shifted from the active mode to the active mode is calculated using Equation 2 shown below.

$$P_{A,A} = 1 - e^{-\lambda \cdot T_R \cdot A} \quad \text{[Equation 2]}$$

To shift an MS from the active mode to the idle mode is performed when the MS does not receive a discovery request signal from a discovery MS in a current interval $T_R$ which is in the active mode. A probability $P_{A,I}$ that an MS will be shifted from the active mode to the idle mode is calculated using Equation 3 shown below.

$$P_{A,I} = e^{-\lambda \cdot T_R \cdot A} \quad \text{[Equation 3]}$$

To shift an MS from the idle mode to the active mode is performed when the MS receives a discovery request signal from at least one discovery MS in the current interval $T_R$ which is in the idle mode. A probability $P_{I,A}$ that an MS will be shifted from the idle mode to the active mode is calculated using Equation 4 shown below.

$$P_{I,A} = 1 - e^{-\lambda \cdot T_R \cdot A} \quad \text{[Equation 4]}$$

To shift an MS from the idle mode to the idle mode is performed when the MS does not receive a discovery request signal from a discovery MS in the current interval $T_R$ which is in the idle mode. A probability $P_{I,I}$ that an MS will be shifted from the idle mode to the idle mode is calculated using Equation 5 shown below.

$$P_{I,I} = e^{-\lambda \cdot T_R \cdot A} \quad \text{[Equation 5]}$$

A balance equation for an active state probability $\pi_A$ and an idle state probability $\pi_I$ can be calculated using the above-described status transition probability using Equation 6 shown below.

$$\pi_A(1 - e^{-\lambda \cdot T_R \cdot A}) + \pi_I(1 - e^{-\lambda \cdot T_R \cdot A}) = \pi_A$$

$$\pi_A e^{-\lambda \cdot T_R \cdot A} + \pi_I e^{-\lambda \cdot T_R \cdot A} = \pi_I$$

$$\pi_A + \pi_I = 1 \quad \text{[Equation 6]}$$

Herein, re-arranging Equation 6, it can be known as $\pi_A = 1 - e^{-\lambda \cdot T_R \cdot A}, \pi_I = e^{-\lambda \cdot T_R \cdot A}$ On the other hand, an MS according to one embodiment of the present disclosure having a period $T_D$ is in the active state during the same time shown in Equation 7 shown below.

$$r^A = \frac{(K + \alpha)t_D \pi_A + \alpha t_D \pi_I}{K T_D} = \frac{t_D(K \pi_A + \alpha)}{K T_D} \quad \text{[Equation 7]}$$

Herein, $\alpha$ denotes $t_R/t_D$. Because $t_R$ denotes a time of a discovery request region in a period $t_D$, $\alpha$ denotes a proportion of $t_R$ to $t_D$.

On the other hand, as well known in a conventional periodic method, in case of the conventional periodic method in which a discovered MS transmits a discovery signal per certain period and a discovery MS receives the discovery signal and recognizes the corresponding discovered MS as a neighbor MS, the discovery MS is in the active state during a time of a ratio shown in Equation 8 shown below to discover neighbor MSs $$r^P = \frac{t_D}{T_D} \quad \text{[Equation 8]}$$

Herein, $r^P$ denotes an active time ratio of the periodic method. $t_D$ denotes time to perform real discovery in the period $T_D$.

In order to indicate performance difference between the method proposed in the present disclosure and the conventional periodic method, a value r in which the active time ratio $r^A$ of the method proposed in the present disclosure is divided by the active time ratio $r^P$ of the periodic method can be defined as a relative proportion of active time and be calculated using Equation 9 shown below.

$$r = \frac{r^A}{r^P} = \pi_A + \frac{\alpha}{K} \quad \text{[Equation 9]}$$

On the other hand, the method proposed in the present disclosure has an idle interval. Therefore, when a discovery request MS is generated, a delay is generated until the discovery request MS enters a discovery step. Of course, a discovery access delay is generated in the periodic method. An average value $D^P$ of the discovery access delay in the periodic method can be calculated using Equation 10 shown below.

$$D^P = \frac{T_D}{2} \quad \text{[Equation 10]}$$

On the other hand, an average value $D^A$ of the discovery access delay in the method proposed in the present disclosure can be calculated using Equation 11 shown below.

$$D^A = \frac{\pi_A}{K}\left(\frac{T_D}{2}(K-1) + t_R + \frac{t_R^2 + (T_D - t_R)^2}{2T_D}\right) + \pi_I\left(\frac{T_R}{2} + t_R\right) = \frac{\pi_A}{K}\left(\frac{T_D}{2}(K-1) + \alpha t_D + \frac{\alpha^2 t_D^2 + (T_D - \alpha t_D)^2}{2T_D}\right) + \pi_I\left(\frac{K t_D}{2} + \alpha t_D\right) \quad \text{[Equation 11]}$$

Figure 15:
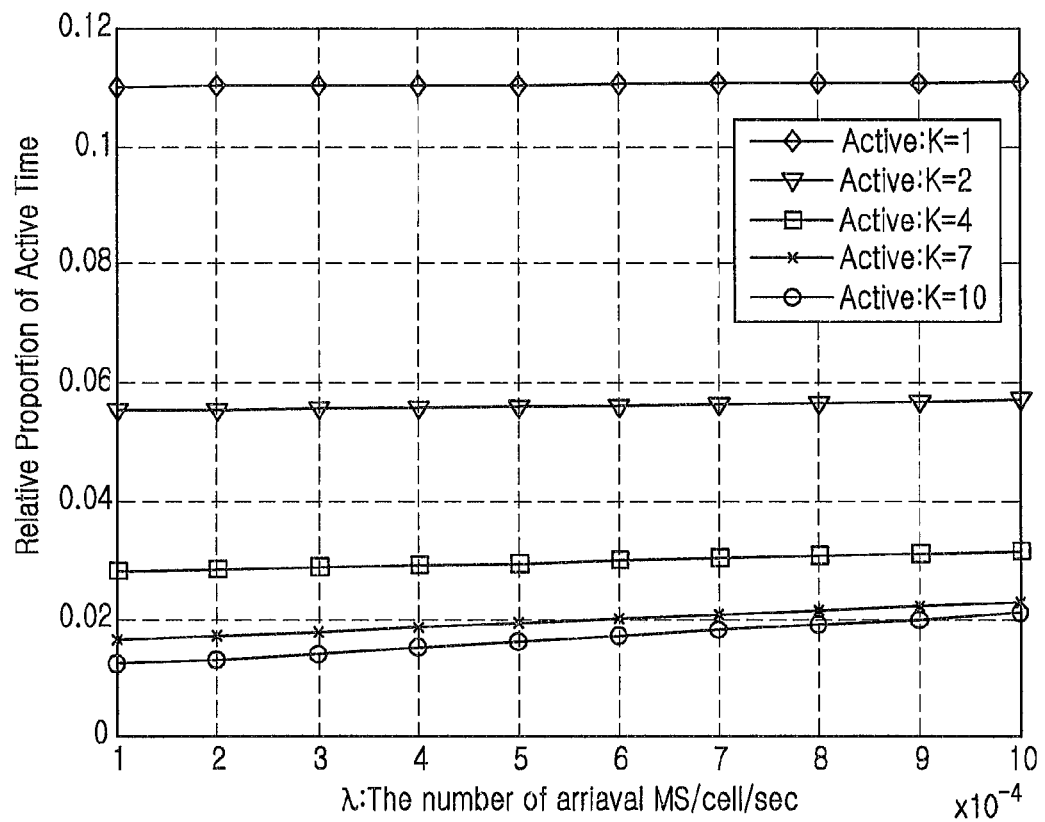
FIGS. 15 to 17 illustrate performance graph diagrams of an MS according to one embodiment of the present disclosure.
Figure 16:
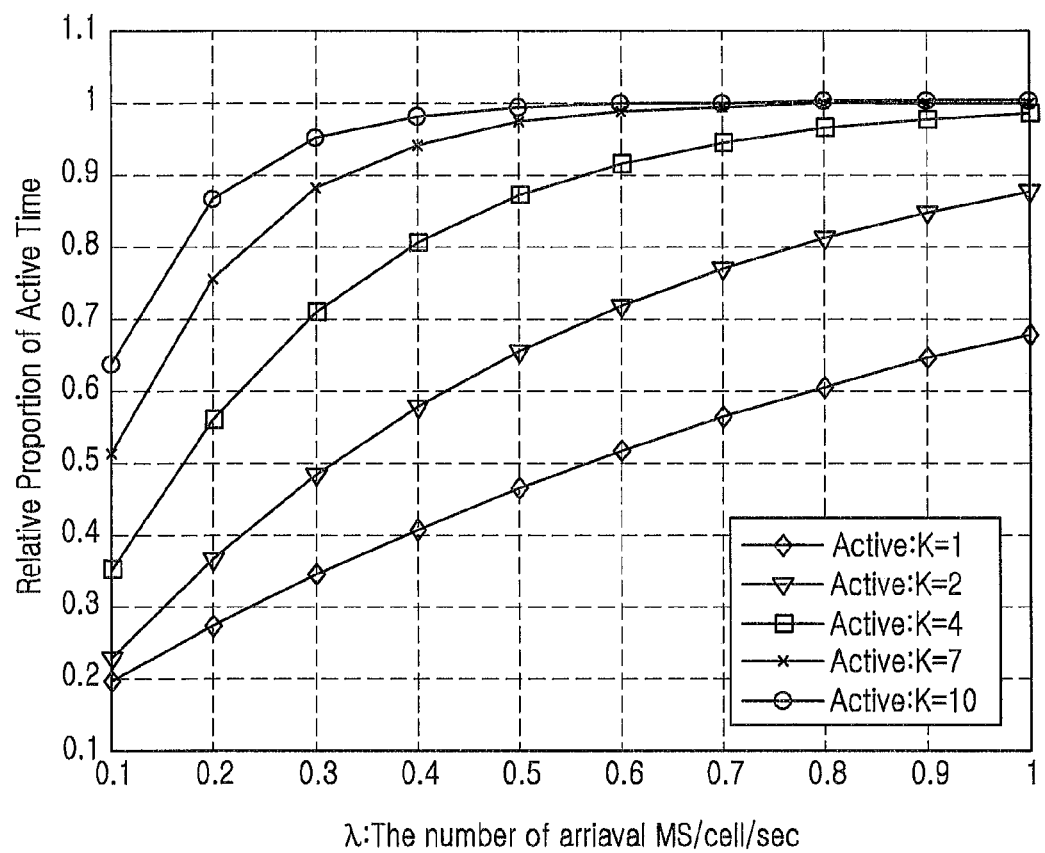
Figure 17:
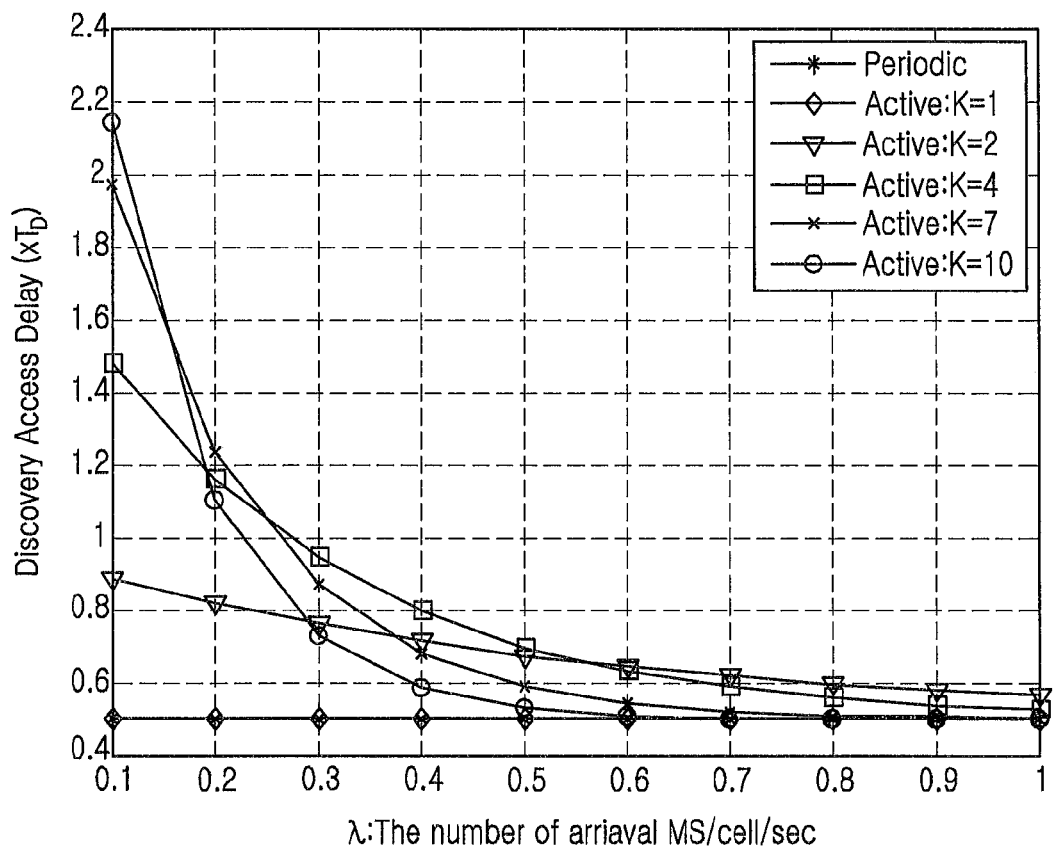

FIGS. 15 to 17 illustrate performance graph diagrams of an MS according to one embodiment of the present disclosure.

First of all, FIG. 15 is a graph diagram illustrating relative proportions of active time according to the appearance frequency of MSs in a situation where appearance frequency of discovery request MSs is low, that is, a region where λ is low while being classified according to K values which are the proportion of $T_R$ to $T_D$. Herein, λ denotes the average number of discovery request MSs which appear in a receivable region of a specific MS. As shown in FIG. 15, the higher K values, the more the relative proportion of active time of an MS is reduced.

FIG. 16 is a graph diagram illustrating relative proportions of active time according to the appearance frequency of MSs in a situation where appearance frequency of discovery request MSs is high, that is, a region where λ is high while being classified according to K values which are the proportion of $T_R$ to $T_D$. Herein, $\lambda$ denotes the average number of discovery request MSs which appear in a receivable region of a specific MS. As shown in FIG. 16, the higher K values is in the region where $\lambda$ is high, the more the relative proportion of active time of an MS is increased.

FIG. 17 is a graph diagram illustrating a discovery access delay time according to the appearance frequency of MSs in a situation where appearance frequency of discovery request MSs is high, that is, a region where $\lambda$ is high while being classified according to K values which are the proportion of $T_R$ to $T_D$. Herein, 0.5 $T_D$ is held always in the conventional periodic method in which a discovered MS transmits a discovery signal per certain period and a discovery MS receives the discovery signal and recognizes the corresponding discovered MS as a neighbor MS. On the other hand, in the method proposed in the present disclosure, the discovery access delay time is quicker than a conventional discovery access delay time in the region where $\lambda$ is low. In the region where $\lambda$ is high, the higher K values, the more the discovery access delay time is reduced.

Unnecessary signaling can be reduced in the discovery process and power consumption can be reduced due to this by informing the discovered MS of whether there is a discovery MS or informing the discovery MS of whether there is a discovered MS in the D2D communication network.

As described above, although the present disclosure is described by limited embodiments and drawings, it is not limited to the embodiments. Various corrections and modifications can be given from this description by those skilled in the art.

Program instructions for executing operations implemented by various computers according to embodiments of the present disclosure can be recorded in the computer-readable storage media. The computer-readable storage media can include program instructions, data files, data structures, etc. separately or by combination of them. The program instructions can be particularly designed and configured for the present disclosure or be used by being well known to those skilled in the part. The computer-readable storage media can include hardware devices which are particularly configured to store and perform program instructions, such as magnetic media such as a hard disc, a floppy disc, and a magnetic tape, optical recording media such as a Compact Disc Read Only Memory (CD-ROM) and a Digital Versatile Disc (DVD), magneto-optical media such as a floptical disk, a ROM, a Random Access Memory (RAM), and a flash memory. Also, the program instructions can include not only a machine language code made by a compiler but also a high-level language code which can be executed by a computer using an interpreter, etc. all or some of BSs or relays described in the present disclosure are implemented by computer programs, the a computer-readable storage media which stores the computer programs is included in the present disclosure.

While the present disclosure has been particularly shown and described with reference to exemplary embodiments thereof, it will be understood by those skilled in the art that various changes in form and details can be made therein without departing from the spirit and scope of the present disclosure as defined by the appended claims.

What is claimed is:

1. A method of a terminal in a device-to-device (D2D) communication network, the method comprising:
broadcasting, in a predetermined resource region included in an interval when a plurality of neighbor terminals operate in an active mode, a request signal for requesting to transmit a response signal;
receiving, from each of at least one neighbor terminal receiving the request signal among the plurality of neighbor terminals, at least one response signal comprising identification information for the each of the at least one neighbor MS; and
updating list information regarding neighbor terminals performing the D2D communication with the terminal, by storing the identification information for the each of the at least one neighbor terminal,
wherein the at least one neighbor terminal receiving the request signal is configured to maintain the active mode.

2. The method of claim 1, further comprising:
upon determining that the terminal does not update the list information regarding the neighbor terminals, listening to the request signal in a first resource region among a plurality of resource regions included in an interval; and
if the request signal is not received, operating in an idle mode,
wherein during the idle mode, the terminal does not listen to the request signal and does not transmit a response signal comprising identification information for the terminal.

3. The method of claim 2, further comprising:
maintaining the idle mode until the request signal is received in another interval comprising a plurality of different resource regions.

4. The method of claim 3, further comprising:
if the request signal is received as a result of the listening, operating in the active mode,
wherein the active mode is a mode in which the terminal broadcasts or receives the response signal comprising the identification information for the terminal in the other resource regions among the plurality of resource regions.

5. The method of claim 1, wherein:
receiving the at least one response signal comprises receiving, in a first resource region after the predetermined resource region, the first resource region included in the interval, and
the method further comprises:
in response to receiving the at least one response signal, determining resources for broadcasting a signal comprising identification information for the terminal, the determined resources included in a second resource region after the first resource region;
broadcasting, in the determined resources included in the second resource region, the signal comprising the identification information for the terminal, and
receiving, in other resources included in the second resource region, at least one other response signal from other terminals among the plurality of neighbor terminals.

6. An apparatus for a terminal in a device-to-device (D2D) communication network, the apparatus comprising:
a transceiver configured to transmit and receive signals for discovering neighbor MS; and
a controller configured to:
broadcast, in a predetermined resource region included in an interval when a plurality of neighbor terminals operate in an active mode, a request signal for requesting to transmit a response signal
receive, from each of at least one neighbor terminal receiving the request signal among the plurality of neighbor terminals, at least one response signal comprising identification information for the each of the at least one neighbor MS; and update list information regarding neighbor terminals performing the D2D communication with the terminal, by storing the identification information for the each of the at least one neighbor terminal, wherein the at least one neighbor terminal receiving the request signal is configured to maintain the active mode.

7. The apparatus of claim 6, wherein the controller is further configured to:

upon determining that the terminal does not update the list information regarding the neighbor terminals, listen to the request signal in a first resource region among a plurality of resource regions included in an interval; and if the request signal is not received, operating in an idle mode, wherein during the idle mode, the controller does not listen to the request signal, and does not transmit a response signal comprising identification information for the terminal.

8. The apparatus of claim 7, wherein the controller is further configured to maintain the idle mode until the request signal is received in another interval comprising a plurality of different resource regions.

9. The apparatus of claim 8, wherein the controller is configured to:

if the request signal is received as a result of the listening, operate in the active mode, wherein the active mode is a mode in which the terminal broadcasts or receives the response signal comprising the identification information for the terminal in the other resource regions among the plurality of resource regions.

10. The apparatus of claim 6, wherein the controller is configured to:

receive, in a first resource region after the predetermined resource region, the first resource region included in the interval, and in response to receiving the at least one response signal, determine resources for broadcasting a signal comprising identification information for the terminal, the determined resources included in a second resource region after the first region;

broadcast, in the determined resources included in the second resource region, the signal comprising the identification information for the terminal; and receive, in other resources included in the second resource region, at least one other response signal from other terminals among the plurality of neighbor terminals.

11. A method of a terminal in a device-to-device (D2D) communication network, the method comprising:

transmitting, to a central node, list information update request signal, wherein the list information is information regarding neighbor terminals performing the D2D communication with the MS;

receiving a signal allocating resources for transmission of a request signal for requesting to transmit a response signal and a discovery measurement request signal;

broadcasting, in a predetermined interval when a plurality of neighbor terminals operate in an active mode, the request signal and the discovery measurement request signal based on the allocated resources; and receiving, from the central node, list information which is updated based on a response signal comprising identification information for each of at least one neighbor terminal among the plurality of terminals and a discovery measurement report signal comprising information indicating strength of the discovery measurement request signal, wherein the response signal and the discovery measurement report signal are received from the each of the at least one neighbors, and wherein the at least one neighbor terminal receiving the request signal is configured to maintain the active mode.

12. The method of claim 11, further comprising:

upon determining that the terminal does not update the list information regarding the neighbor terminals, listening to the request signal in a first resource region among a plurality of resource regions included in an interval; and if the request signal is not received, operating in an idle mode, wherein during the idle mode, the terminal does not listen to the request signal, and does not transmit a response signal comprising identification information for the terminal.

13. The method of claim 12, further comprising:

maintaining the idle mode until the request signal is received in another interval comprising a plurality of different resource regions.

14. The method of claim 13, further comprising:

if the request signal is received as a result of the listening, operating in the active mode, wherein the active mode is a mode in which the discovery terminal broadcasts or receives the response signal comprising the identification information for the terminal in the other resource regions among the plurality of resource regions.

15. A method of a central node for discovering neighbor terminals in a D2D communication network, the method comprising:

receiving, from a discovery terminal, list information update request signal, wherein the list information is information regarding neighbor terminals performing the D2D communication with the discovery terminal;

allocating resources for transmitting a request signal for requesting a response signal and a discovery measurement request signal;

receiving, from each of at least one neighbor terminal among a plurality of terminals, a request signal comprising identification information for the each of the at least one neighbor terminal and a discovery measurement report signal comprising information indicating strength of the discovery measurement request signal; and updating the list information based on the identification information for the each of the at least one neighbor terminal and the discovery measurement report signal; and transmitting, to the discovery terminal, the updated list information.

16. The method of claim 15, wherein the resources for transmitting the request signal are included in a first resource region among a plurality of resource regions included in an interval.

* * * * *